(12) United States Patent
Kobayashi et al.

(10) Patent No.: US 7,983,816 B2
(45) Date of Patent: Jul. 19, 2011

(54) CONTROL APPARATUS FOR ELECTRIC POWER STEERING APPARATUS

(75) Inventors: Hideyuki Kobayashi, Maebashi (JP); Toru Sakaguchi, Gunma (JP); Shuji Endo, Maebashi (JP); Atsushi Kojima, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 12/838,038

(22) Filed: Jul. 16, 2010

(65) Prior Publication Data

US 2010/0286871 A1 Nov. 11, 2010

Related U.S. Application Data

(62) Division of application No. 11/813,887, filed on Jul. 13, 2007, now Pat. No. 7,873,453.

(30) Foreign Application Priority Data

| Jan. 14, 2005 | (JP) | 2005-008100 |
| Jan. 24, 2005 | (JP) | 2005-015003 |
| Jan. 31, 2005 | (JP) | 2005-023803 |
| Oct. 31, 2005 | (JP) | 2005-315602 |

(51) Int. Cl.
*A01B 69/00* (2006.01)

(52) U.S. Cl. .......................... 701/41; 701/42
(58) Field of Classification Search .................. 701/41, 701/42; 180/443
See application file for complete search history.

(56) References Cited

U.S. PATENT DOCUMENTS

| 6,272,410 B2 * | 8/2001 | Okanoue et al. ............... 701/42 |
| 6,681,165 B2 | 1/2004 | Shibasaki et al. |
| 6,876,911 B2 | 4/2005 | Chen et al. |
| 2002/0056587 A1 | 5/2002 | Shibasaki et al. |

FOREIGN PATENT DOCUMENTS

| JP | 5-213222 A | 8/1993 |
| JP | 8-290778 A | 11/1996 |
| JP | 8-310417 A | 11/1996 |
| JP | 10-016809 A | 1/1998 |
| JP | 11-048998 A | 2/1999 |
| JP | 2000-168600 A | 6/2000 |
| JP | 2002-029441 A | 1/2002 |
| JP | 2002-037109 A | 2/2002 |
| JP | 2002-145075 A | 5/2002 |
| JP | 2002-161969 A | 6/2002 |
| JP | 2002-274405 A | 9/2002 |
| JP | 2002-369565 A | 12/2002 |
| JP | 2003-170856 A | 6/2003 |

* cited by examiner

*Primary Examiner* — Mark Hellner
(74) *Attorney, Agent, or Firm* — Sughrue Mion, PLLC

(57) ABSTRACT

The present invention provides a control apparatus for an electric power steering apparatus comprises: a steering assist command value calculating section; a current control section that calculates a voltage command value; and a motor driving section that drives a motor based on the voltage command value, wherein an assist power from the motor is applied to a steering system, the control apparatus is characterized in that an SAT measuring section, that inputs an angular speed and an angular acceleration of the motor, the steering assist command value and the torque signal therein so as to estimate an SAT, is provided, and the SAT obtained by the SAT measuring section is feedbacked to the steering assist command value via a feedback section composed of a phase compensating section and a gain section.

6 Claims, 18 Drawing Sheets

| RETURNING | | -1.0 | -0.8 | -0.7 | -0.6 | -0.5 |
|---|---|---|---|---|---|---|
| TURNING | | 0 | +0.2 | +0.3 | +0.4 | +0.5 |

FIG.19

|  | PATTERN A | PATTERN B | PATTERN C |
|---|---|---|---|
| TURNING STEERING | NEGATIVE | 0 | 0 |
| RETURNING STEERING | 0 | POSITIVE | 0 |
| STEERING HOLDING | 0 | 0 | POSITIVE |

US 7,983,816 B2

CONTROL APPARATUS FOR ELECTRIC POWER STEERING APPARATUS

CROSS REFERENCES TO RELATED APPLICATIONS

This is a divisional of application Ser. No. 11/813,887, filed Jul. 13, 2007, which is a National Stage of International Application No. PCT/JP2006/300662 filed Jan. 12, 2006 and claims priority from Japanese Patent Application No. 2005-008100 filed Jan. 14, 2005 in the Japanese Intellectual Property Office, Japanese Patent Application No. 2005-15003, filed Jan. 24, 2005 in the Japanese Intellectual Property Office, Japanese Patent Application No. 2005-23803 filed Jan. 31, 2005 in the Japanese Intellectual Property Office, Japanese Patent Application No. 2005-315602 filed Oct. 31, 2005 in the Japanese Intellectual Property Office, the entire contents of which are incorporated herein by reference.

TECHNICAL FIELD

The present invention relates to a control apparatus for an electric power steering apparatus in which a steering assist power from a motor is applied to a steering system of an automobile or a vehicle, and particularly relates to the control apparatus for the electric power steering apparatus that executes a signal process on road information, disturbance or the like in a high frequency area so as to be capable of obtaining a safe and comfortable steering performance which provides easy tuning.

Further, the present invention relates to a control apparatus for an electric power steering apparatus in which a control apparatus for an electric power steering apparatus in which a self-aligning torque (SAT) is compensated on the basis of turning and returning directions of a steering wheel.

BACKGROUND ART

An electric power steering apparatus, that applies an assist load to a steering apparatus of an automobile or a vehicle by means of rotational force of a motor, applies an assist load to a steering shaft or a rack shaft by transmitting a driving power of the motor using a transmission mechanism such as gears or a belt via a speed reduction device. In order to accurately generate an assist torque (steering assist torque), such a conventional electric power steering apparatus carries out a feedback control of motor currents. The feedback control adjusts a motor applying voltage so that a difference between a current command value and a detected motor current value becomes small or zero, and the adjustment of the motor applying voltage is generally made by adjusting a duty ratio of a pulse width modulation (PWM) control.

A general constitution of the electric power steering apparatus is explained with reference to FIG. 1. A column shaft 2 of a steering wheel 1 is connected to a tie rod 6 via reduction gears 3, universal joints 4a and 4b and a pinion rack mechanism 5. The column shaft 2 is provided with a torque sensor 10 that detects a steering torque of the steering wheel 1, and a motor 20 that assists a steering power of the steering wheel 1 is connected to the column shaft 2 via the reduction gears 3. An electric power is supplied from a battery 14 via an ignition key 11 to a control unit 100 that controls the power steering apparatus, and the control unit 100 operates a steering assist command value I of an assist command based on a steering torque signal Tr detected by the torque sensor 10 and a vehicle speed signal Vel detected by a vehicle speed sensor 12 so as to control an electric current to be supplied to the motor 20 based on the operated steering assist command value I.

In such an electric power steering apparatus, as disclosed in Japanese Patent Application Laid-open No. 8-290778 A, for example, conventionally a robust stabilizing compensator in the control unit 100 simultaneously designs a stability of a system and sensitivity characteristics of a road information and a disturbance information.

In the conventional control apparatus, however, since a reaction force at a time of a steering near a steering neutral point is small, it is difficult to accurately transmit the road information to a driver due to an influence of friction. Further, in the conventional electric power steering apparatus, it is difficult to make a hysteresis characteristic between a steering angle and a steering power equivalent to a characteristics of a hydraulic power steering.

An apparatus which solves such problems is disclosed in Japanese Patent Application Laid-open No. 2002-369565 A.

An outline of the apparatus disclosed in Japanese Patent Application Laid-open No. 2002-369565 A is explained with reference to FIG. 2 related with FIG. 1. The motor 20 that generates an assist steering power of the steering apparatus is driven by a motor driving section 21, the motor driving section 21 is controlled by the control unit 100 shown by alternate long and two short dashes line, and the steering torque signal Tr from the torque sensor and the vehicle speed signal Vel from the vehicle speed detecting system are inputted to the control unit 100. In the motor 20, a motor inter-terminal voltage Vm and a motor current value i are measured so as to be outputted.

The control unit 100 is composed of a torque-system control section 110 shown by a broken line that makes a control using the steering torque signal Tr, and a motor-system control section 120 shown by alternate long two short dashes line that makes a control relating to the driving of the motor 20. The torque-system control section 110 is composed of an assist amount operating section 111, a differentiation controller 112, a yaw-rate convergence control section 113, a robust stabilization compensating section 114 and an SAT estimating feedback section 115. The torque-system control section 110 has adders 116A and 116B and a subtracter 116C. Further, the motor-system control section 120 is composed of a compensator 121, a disturbance estimator 122, a motor angular speed estimating section 123, a motor angular acceleration estimating section (differentiator) 124 and a motor characteristic compensating section 125, and has adders 126A and 126B.

The steering torque signal Tr is inputted to the assist amount operating section 111, the differentiation controller 112, the yaw rate convergence control section 113 and the SAT estimating feedback section 115, and at this time, the vehicle speed signal Vel is inputted to them as a parameter. The assist amount operating section 111 operates an assist torque amount based on the steering torque signal Tr, the yaw-rate convergence control section 113 inputs the steering torque signal Tr and an estimated value ω of the motor angular speed and applies the brake to a swing operation of the steering wheel in order to improve the yaw convergence characteristics of the vehicle. Further, the differentiation controller 112 improves a responsiveness of control near the steering neutral point and realizes a smooth steering. The SAT estimating feedback section 115 inputs the steering torque signal Tr, a signal which is obtained by adding an output from the differentiation controller 112 to an output from the assist amount operating section 111 by means of the adder 116A, the angular speed estimated value ω which is estimated by the motor angular speed estimating section 123 and the angular acceleration estimated value *ω from the motor angular acceleration estimating section 124 therein so as to estimate the SAT, and executes a signal process on the estimated SAT using a feedback filter, so as to supplies the road information suitable for the steering wheel as a reaction force.

A signal, which is obtained by adding the output from the yaw rate convergence control section 113 to the signal obtained by adding the output from the differentiation controller 112 to the output from the assist amount operating section 111 by means of the adder 116B, is inputted as an assist amount AQ to the robust stabilization compensating section 114. The robust stabilization compensating section 114 is, for example, a compensating section disclosed in Japanese Patent Application Laid-open No. 8-290778 A, and removes a peak value at a resonance frequency of a resonance system composed of an inertial element and a spring element included in the detected torque, and compensates a phase shift of the resonance frequency that disturbs the responsiveness and the stability of the control system. The subtracter 116C subtracts the output of the SAT estimating feedback section 115 from the output of the robust stabilization compensating section 114 so as to obtain an assist amount Ia for enabling the road information to be transmitted as the reaction force to the steering wheel.

Further, the motor angular speed estimating section 123 estimates the motor angular speed a based on the motor inter-terminal voltage Vm and the motor current value i, and the motor angular speed ω is inputted to the motor angular acceleration estimating section 124, the yaw rate convergence control section 113 and the SAT estimating feedback section 115. The motor angular acceleration estimating section 124 estimates a motor angular acceleration based on the inputted motor angular speed ω, and the estimated motor angular acceleration *ω is inputted to the motor characteristic compensating section 125. The adder 126A adds an assist amount Ia, which is obtained by subtracting the output of the SAT estimating feedback section 115 from the output of the robust stabilization compensating section 114, to the output Ic of the motor characteristic compensating section 125, and the added signal is inputted as a current command value Ir to the compensator 121 as the differentiation compensator or the like. A signal, which is obtained by adding the output of the disturbance estimator 122 to the current command value Ira compensated by the compensator 121 by means of the adder 126B, is inputted to the motor driving section 21 and the disturbance estimator 122. The disturbance estimator 122 is a device disclosed in Japanese Patent Application Laid-open No. 8-310417 A, and can maintain a desired motor control characteristics in an output basis of the control system based on a signal as a control target of the motor output which is obtained by adding the output of the disturbance estimator 122 to the current command value Ira compensated by the compensator 121 and the motor current value i, so that the stability of the control system is prevented from being lost.

A state of the torque generated between the road surface and the steering is explained with reference to FIG. 3. When a driver steers the steering wheel 1 so that a steering torque Th is generated, and the motor 20 generates an assist torque Tm according to the steering torque Th. As a result, wheels are steered, and an SAT is generated as the reaction force. At this time, an inertial J and a friction (static friction) Fr of the motor 20 generate a torque as resistance of the steering of the steering wheel 1. When the balance of these forces is considered, the following motion equation (1) is obtained:

$$J \cdot {}^*\omega + Fr \cdot sign(\omega) + SAT = Tm + Th \tag{1}$$

When the above equation (1) whose inertial value is zero is Laplace-transformed and is solved for the SAT, the following equation (2) is obtained:

$$SAT(s) = Tm(s) + Th(s) - J \cdot {}^*\omega(s) - Fr \cdot sign(\omega(s)) \tag{2}$$

As is clear from the equation (2), when the inertial J and the static friction Fr of the motor 20 are previously obtained as constant, the SAT can be estimated based on the motor rotational angular speed ω, the rotational angular acceleration *ω, the steering assist force and a steering signal. For this reason, the steering torque signal Tr, the angular speed ω, the angular acceleration *ω, and the output of the assist amount operating section 111 are inputted to the SAT estimating feedback section 115.

When the SAT information estimated by the SAT estimating feedback section 115 is directly feedbacked, the steering becomes too heavy, and thus steering feeling cannot be improved. For this reason, as shown in FIG. 4, the estimated value of the SAT is subject to the signal process by using a feedback filter 115A having a vehicle speed sensitive gain and a frequency characteristic, and only information which is sufficiently necessary for improving the steering feeling is feedbacked. The feedback filter to be used here has a Q filter (phase delay) 115B having a gain for reducing the estimated SAT to the sufficiently necessary value as a static characteristic gain and a gain section 115C which is sensitive to the vehicle speed Ve1 as shown in FIG. 5, and when the importance of the road information such as a stationary steering and a low-speed traveling is comparatively low, the road information to be feedbacked is reduced.

In the above apparatus disclosed in Japanese Patent Laid-open No. 2002-369565 A, since the SAT functions as disturbance for the electric power steering, the SAT is estimated by a disturbance observer constitution. The phase delay filter (Q filter) is used for the feedback because the estimated SAT as the disturbance is prevented from being diffused in the disturbance observer. The estimated SAT value, however, naturally becomes a value after passing the Q filter (phase delay), and thus a delay is generated in the steering transmission system.

In the apparatus disclosed in Japanese Patent Laid-open No. 2002-369565 A, the SAT estimating feedback is also constituted so that a frequency band where disturbance which is desired to be suppressed is present is compatible with a frequency band where disturbance which is desired to be transmitted is present, but does not have a function for positively canceling the disturbance which is desired to be suppressed.

On the other hand, in vehicles, brake judder and shimmy which make uncomfortable to vehicle occupants occur at a time of a normal braking and a stationary traveling. The brake judder means a floor/pedal vibration which is generated at the time of braking of vehicles, and occasionally causes the vibration to a steering rotational direction. The source of the vibration is a braking torque variation generated due to DTV (Disk Thickness Variation) of a brake disc, and the braking torque variation has a primary component and a high-order component of a rotation of wheels. This is amplified by resonance before or after suspension or the like, the amplified brake judder is transmitted to a vehicle body or a steering system so as to become the floor/pedal vibration or the steering vibration. Further, the shimmy is vibration which is generated in the steering rotational direction when a vehicle travels, and its source is unbalance and non-unifoiniity of rotating portions of tire wheels. The shimmy is amplified by suspension resonance and becomes the vibration in the steering rotational direction via the steering system.

Such the brake judder and the shimmy are not taken into consideration at all in the apparatus of Japanese Patent Laid-open No. 2002-369565 A. Japanese Patent Application Laid-open No. 2002-145075 A and Japanese Patent Application Laid-open No. 2002-161969 A disclose apparatus that attenuate vibration due to the brake judder and the shimmy, but they mechanically cope with the brake judder and the shimmy, thereby arising problems such that the cost increases and fine suppression, such as vehicle speed sensitivity, cannot be performed.

Further, when the inertial and the friction of the steering system are large, the vibration due to the brake judder is not transmitted to the steering wheel, but it is desirable that the inertial and the friction of the steering system are as small as possible in order to obtain a satisfactory steering feeling and a stability of the vehicle.

Still further, the control unit 100 could be also described as FIG. 6. The steering torque value T detected by means of the torque sensor 10 to be inputted and the vehicle speed V from the vehicle speed sensor 12 are inputted to a current command value operating section 31 for operating a current command value Iref. The current command value operating section 31 determines the current command value Iref, which is a control target value of a current supplied to the motor 20, on the basis of the inputted steering torque value T and the inputted vehicle speed V. The current command value Iref is inputted to a subtracter 32 so that a deviation I (Iref-Im) from a motor current value Im, which is feedbacked, would be operated. The deviation is inputted to a PI-controlling section 33 for improving a specific property in a steering operation. A steering assist command value Vref improved in specific property in the PI-controlling section 33 is inputted to a PWM-controlling section 34 to PWM-drive the motor 20 through an inverter 35 provided as a driving part. The current value Im of the motor 20 is detected by means of a motor current detector 36 to be feedbacked to the subtracter 32. The inverter 35 includes FETs used as driving devices and comprises a bridge circuit of the FETs.

Such an electric power steering apparatus has a self-aligning torque (SAT) function. That is to say, wheels of a vehicle automatically returns to a neutral position when a driver reduces force for rotating a steering wheel or makes the force zero (namely, a hand-losing state of losing his or her hold of the steering wheel) in a process of returning to a straight run after a changing steering. Such the SAT for returning to the neutral position becomes larger, the faster the vehicle speed is. In the electric power steering apparatus, the wheels move in a direction to the neutral position (leftward) in accordance with the SAT function when the wheels are first changed rightward in the steering, for example. The steering torque should be zero since the force for rotating the steering wheel by a driver is zero. Accordingly, the steering torque value detected by the torque sensor also becomes zero, a current is not applied to the motor, the steering assist power is not generated, and therefore, the wheels rotate leftward as they are connected to the steering apparatus. The steering wheel, of course, also rotates leftward.

The conventional electric power steering apparatus, however, has a problem that a frictional power or the like, which corresponds to the friction of the rotor of the motor and the frictions of the vehicle and the steering system, deteriorates the returning of the steering wheel after the changing steering in a low-speed run and deteriorates an on-center feeling such as a steering wheel returning feeling and a friction feeling in a high-speed run. That is to say, in a process that a driver rotates the steering wheel and changes the steering at a low speed to return to the straight run, the electric power steering apparatus is so worse in returning of the steering wheel than a manual steering apparatus or a hydraulic power steering apparatus that the driver must rotate the steering wheel again to a direction of a straight run in an extreme instance. Further, in a process to return to the straight run after the changing steering for the purpose of changing lanes or correcting a direction in the high-speed run (especially in a process of returning in a hand-losing state without holding the steering wheel), the wheels cannot completely return to the center position (the neutral position) even when the SAT function lets the wheels return to the neutral position. In an extreme case, the driver must rotate the steering wheel in a direction of the straight run once more.

As a solution method of such a problem, proposed has been a power steering apparatus in which a road surface reaction force torque detector is used as a steering wheel returning correcting section for correcting or removing the friction, a steering wheel angle detector for detecting an angle of rotation of the steering wheel is provided as the road surface reaction force torque detector, a steering wheel returning correction quantity is obtained on the basis of a steering wheel angle signal outputted from the steering wheel angle detector and the correction quantity is used for adjusting imbalance in the friction, which is generated in accordance with a rotation or a direction of movement of the steering wheel and the steering system, in order to even a left-and-right difference of a returning property of the steering wheel.

Similarly, also provided has been a power steering apparatus in which a road surface reaction force torque detector as the steering wheel returning correcting section for correcting or removing the friction is formed from a road surface reaction force torque estimating means, the road surface reaction force torque estimating means is used for generating a road surface reaction force torque estimation signal by performing a low pass filter (LPF) or a delay filter process for a value obtained by adding the motor torque operated in terms of a steering shaft on the basis of an output of a current detector for detecting a current of the motor to an output of the steering torque detector and by subtracting the motor inertia torque in terms of the steering shaft, the steering wheel returning correction quantity is obtained on the basis of the road surface reaction force torque estimation signal and the correction quantity is used for adjusting imbalance in the friction, which is generated in accordance with a rotation or a direction of movement of the steering wheel and the steering system, in order to even a left-and-right difference of a returning property of the steering wheel.

In such conventional examples, there is a shortcoming that the steering power is too heavy in turning the steering wheel when the friction of the vehicle is large although an effect of improving returning of the steering wheel in losing driver's hold of the steering wheel can be expected in the case of a low speed. Generally, the manual steering power without the power assist in turning the steering wheel during a turn at a bend becomes a value obtained by adding the reaction force from the road surface to the friction of the steering system, and thus, is heavier than the road surface reaction force by the friction. To the contrary, the manual steering power in returning the steering wheel becomes a value obtained by subtracting the friction of the steering system from the road surface reaction force, the value being lighter than the road surface reaction force by the friction. This mainly causes deterioration in returning of the steering wheel. Accordingly, especially in the case of an automobile having a large value of friction of the vehicle and the steering system, the steering wheel returning correction quantity for overcoming the friction to return the steering wheel tends to increase. This causes a drawback that performing the correction in turning and returning with a same coefficient on the basis of the road surface reaction force results in excessively heavy power in returning and turning the steering wheel during a turn at a bend in a low-speed run, which especially requires good returning of the steering wheel from a position at a large steering angle, and thereby, results in great imbalance.

In order to solve the problems, proposed is the control apparatus for the electric steering system disclosed in Japanese Patent Application Laid-open No. 2002-29441 A. The control apparatus is the electric power steering apparatus provided with a motor interposed in a steering torque transmission mechanism from a steering wheel to wheels to generate a torque for assisting the steering torque by a driver, the electric power steering apparatus comprising a steering wheel return correcting section for correcting the friction of a rotor of the motor and the friction of a vehicle and a steering system and a steering state discriminative compensating section for discriminating the turning and returning of the steering wheel, wherein the correction quantity of the steering wheel return correcting section is set to different values according to the turning and returning directions of the steering wheel.

The control apparatus disclosed in Japanese Patent Application Laid-open No. 2002-29441 A, however, only puts a bad returning of the steering wheel during the low speed rotation of the steering wheel in question, but does not take the SAT into account. Accordingly, the road surface reaction force of a vehicle is so strong that the steering wheel suddenly returns excessively in some cases. This causes a strong requirement for the solution.

Recently, a vehicle on which an electric power steering is mounted has been further increased in size. This causes a problem that a good steering feeling (especially turning and returning of a steering wheel) cannot be achieved in controlling a conventional small-sized vehicle.

The present invention is devised in order to solve the above problems, and an object is to provide a control apparatus for an electric power steering apparatus that executes a signal process on road information, disturbance or the like in a frequency area without delay so as to be capable of obtaining a safe and comfortable steering performance which provides an easy tuning, and a brake judder and shimmy suppression.

Another object of the present invention is to provide a control apparatus for an electric power steering apparatus with a high performance and applicable in both of the cases that the returning of the steering wheel is bad and that the steering wheel excessively returns by taking a self-aligning torque (SAT) into account.

DISCLOSURE OF THE INVENTION

The present invention relates to a control apparatus for an electric power steering apparatus composed of: a steering assist command value calculating section that calculates a steering assist command value based on a torque signal from a torque sensor; an electric current control section that calculates a voltage command value based on the steering assist command value; and a motor driving section that drives a motor based on the voltage command value, wherein an assist power from the motor is applied to a steering system, and the above object of the present invention is attained by providing the control apparatus is characterized in that an SAT measuring section, that inputs an angular speed and an angular acceleration of the motor, the steering assist command value and the torque signal therein so as to estimate a self-aligning torque (SAT) or to measure an SAT using a sensor, and that the SAT obtained by the SAT measuring section is feedbacked to the steering assist command value via a feedback section composed of a phase compensating section and a gain section.

The present invention relates to a control apparatus for an electric power steering apparatus that is composed of: a steering assist command calculating section that calculates a steering assist command value based on a torque signal from a torque sensor; an electric current control section that calculates a voltage command value based on the steering assist command value; and a motor driving section that drives a motor based on the voltage command value, and an assist power of the motor is applied to a steering system, and the object of the present invention is achieved by providing: an SAT feedback section that inputs a motor rotational angular speed, a motor rotational angular acceleration, a steering assist power and a steering signal therein so as to estimate a self-aligning torque (SAT) or to measure an SAT using a sensor, and in that the SAT value obtained by the SAT feedback section is added to the steering assist command value via a high pass filter and a gain section.

Further, the present invention relates to a control apparatus for an electric power steering apparatus including a current commanding value operating section for operating a current command value on the basis of a steering torque value from a steering torque detecting means and a vehicle speed and a motor drive controlling section for controlling a motor for supplying a steering mechanism with a steering assist power on the basis of a current value of the motor and the current command value, the control apparatus comprising: and the object of the present invention is achieved by providing: a detecting means for detecting a rack shaft reaction force, a turning/returning discriminating section for discriminating a turning or a returning of a steering wheel, and wherein the current commanding value is corrected on the basis of the rack shaft reaction force and a result of the determination in the turning/returning discriminating section.

Still further, the present invention relates to a control apparatus for an electric power steering apparatus including a current command value operating section for operating a current command value on the basis of a steering torque value from a steering torque detecting means and a vehicle speed and a motor drive controlling section for controlling a motor for supplying a steering mechanism with steering assist power on the basis of a current value of the motor and the current command value, and the object of the present invention can be achieved by providing a self-aligning torque (SAT) section for detecting or estimating an SAT, a turning/returning discriminating section for discriminating a turning or a returning of a steering wheel, and a gain section for gain-changing the SAT in accordance with an output of the turning/returning discriminating section, to subtract the SAT compensating value outputted from the gain section from the current command value.

Moreover, the present invention relates to a control apparatus for an electric power steering apparatus including a current commanding value operating section for operating a current command value on the basis of a steering torque value from a steering torque detecting means and a vehicle speed and a motor drive controlling section for controlling a motor for supplying a steering mechanism with a steering assist power on the basis of a current value of the motor and the current command value, and an object of the present invention can be achieved by providing an SAT section for detecting or estimating an SAT, a turning/returning discriminating section for discriminating a turning or a returning of a steering wheel, a gain section for gain-changing the SAT in accordance with an output from the turning/returning discriminating section; a function converting section for function-converting an angle speed and a multiplying section for multiplying the SAT compensating value outputted from the gain section by an angle speed function outputted from the function converting section, to subtract a result of the multiplication in the multiplying section from the current command value.

BRIEF DESCRIPTION OF THE DRAWINGS

In the accompanying drawings:

FIG. 19 is a diagram showing a concrete example of a steering condition sensitive gain set by a steering condition sensitive gain section;

BEST MODE FOR CARRYING OUT THE INVENTION

Various embodiments of the present invention are explained below with reference to drawings.

Since a self-aligning torque (SAT) seems to be disturbance of an electric power steering, the SAT is estimated or measured by a disturbance observer constitution. The disturbance observer has a Q-filter (phase delay) so that estimated or measured disturbance is prevented from being diffused at the time of a feedback (for example, Japanese Patent Application Laid-open No. 2002-369565 A), but since it is not an object of the SAT feedback to cancel the SAT as disturbance, the completely same constitution as that of the disturbance observer is not necessary. The SAT feedback is a design of disturbance sensitivity.

In the present invention, a phase-lead compensation is made on an estimated SAT value, so that a delay of a steering transmission system is compensated. When the SAT is feedbacked without delay, linearity is generated in the steering force, steering feeling (direct feeling or sense of unity) as well as sense of rigidity is improved. Particularly, traveling characteristics on a low-friction road are improved. When influences of unnecessary disturbance and noise cannot be ignored at the time of compensating a delay with a phase-lead element, a low pass filter (LPF) is disposed so as to eliminate the influences of the disturbance and the noise. Further, since characteristics of the SAT and characteristics of road information which are not desired to be transmitted to drivers change due to a vehicle speed (high, intermediate, low), the feedback characteristics are changed according to the vehicle speed.

Figure 1:
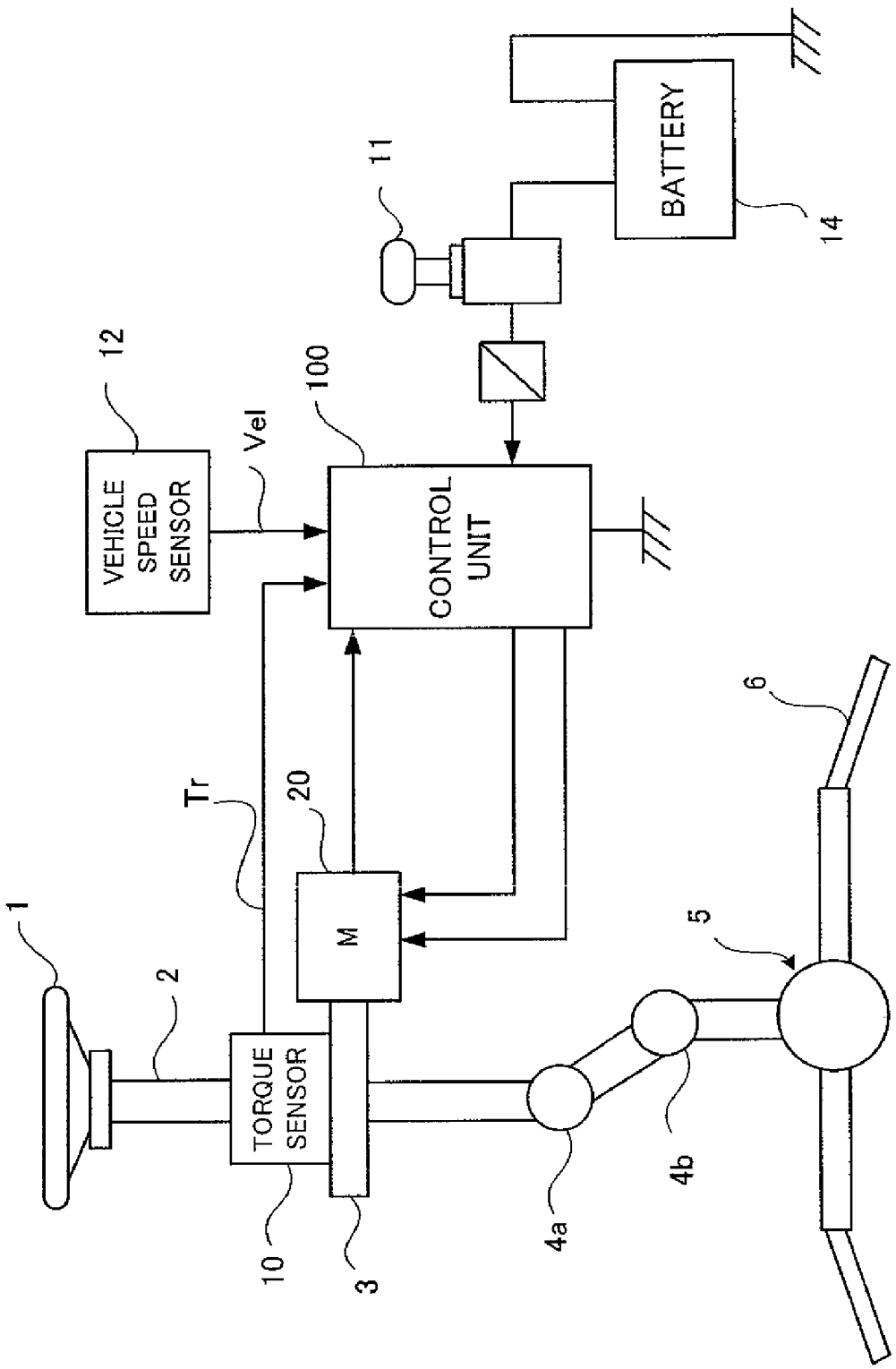
FIG. 1 is a diagram illustrating an example of a general steering mechanism.
Figure 2:
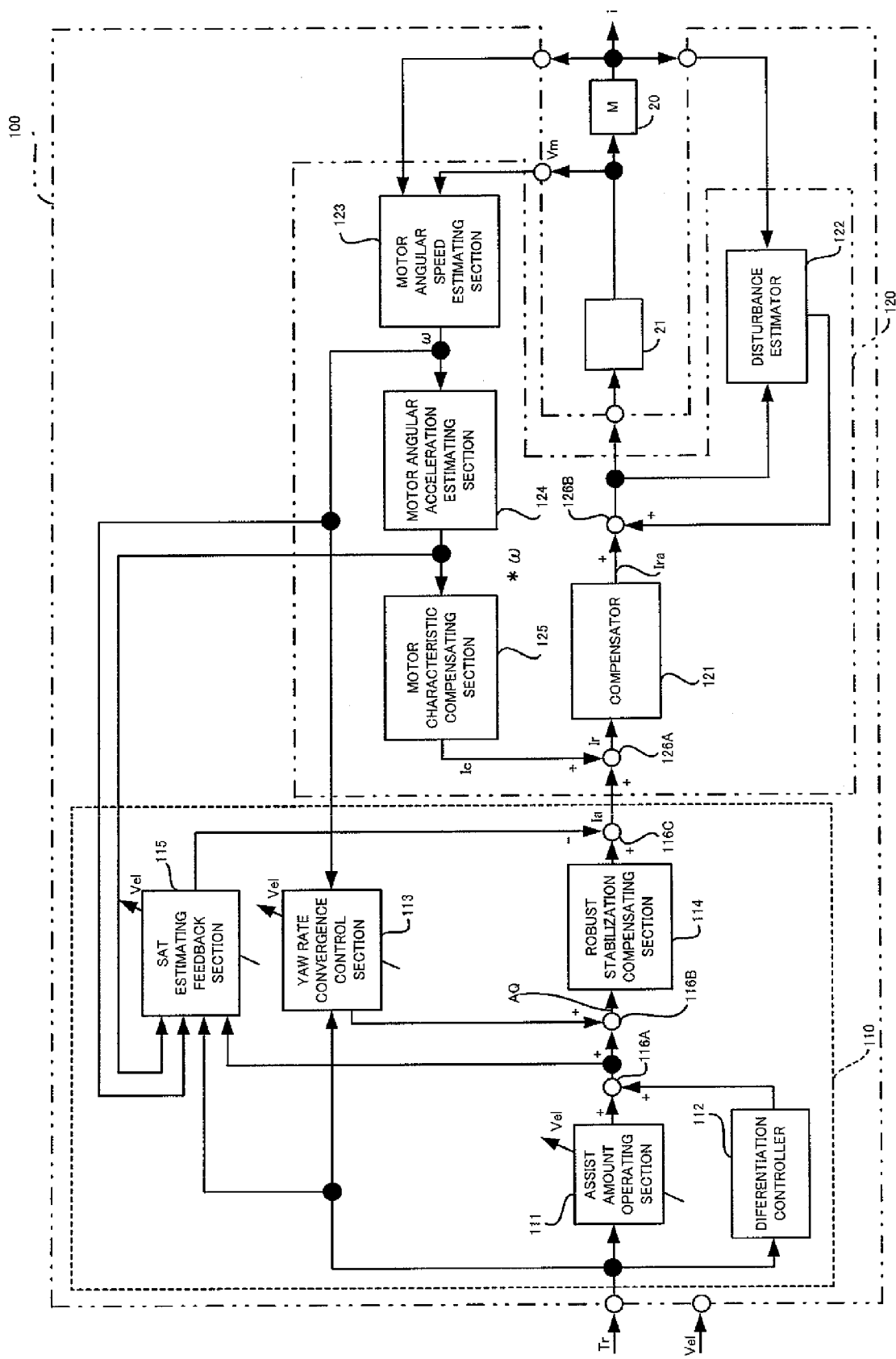
FIG. 2 is a block diagram to show a constitutional example of a conventional control unit.
Figure 3:
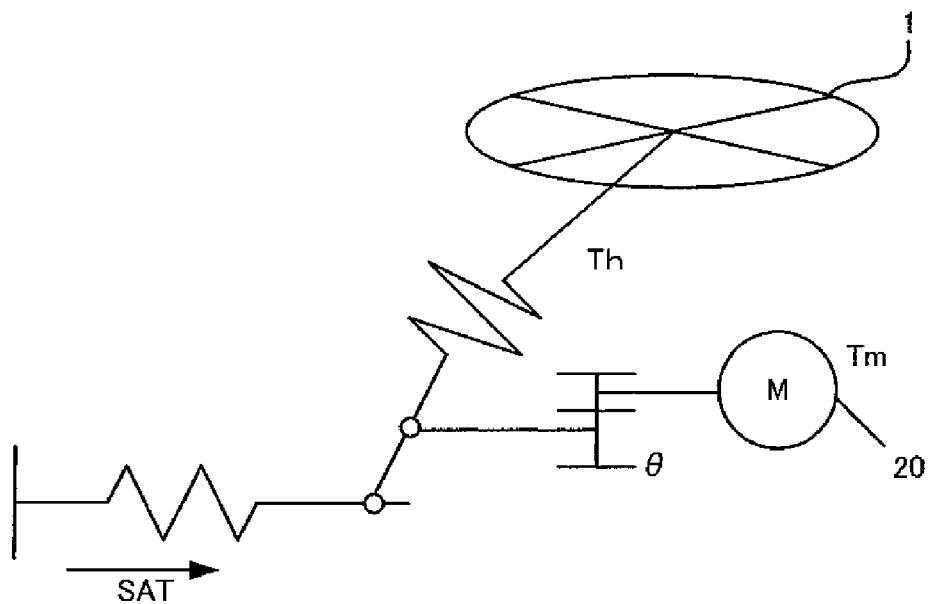
FIG. 3 is a schematic diagram to show a state of a torque generated between a road surface and a steering wheel.
Figure 4:
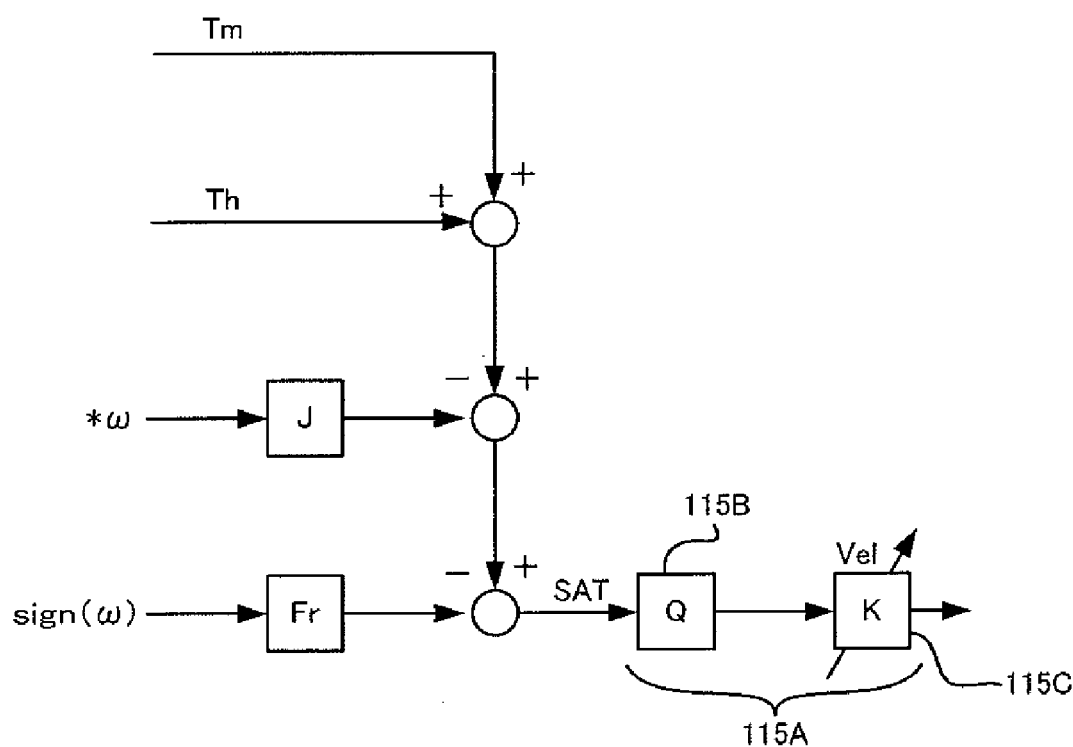
FIG. 4 is a diagram illustrating a conventional constitutional example of the feedback section.
Figure 5:
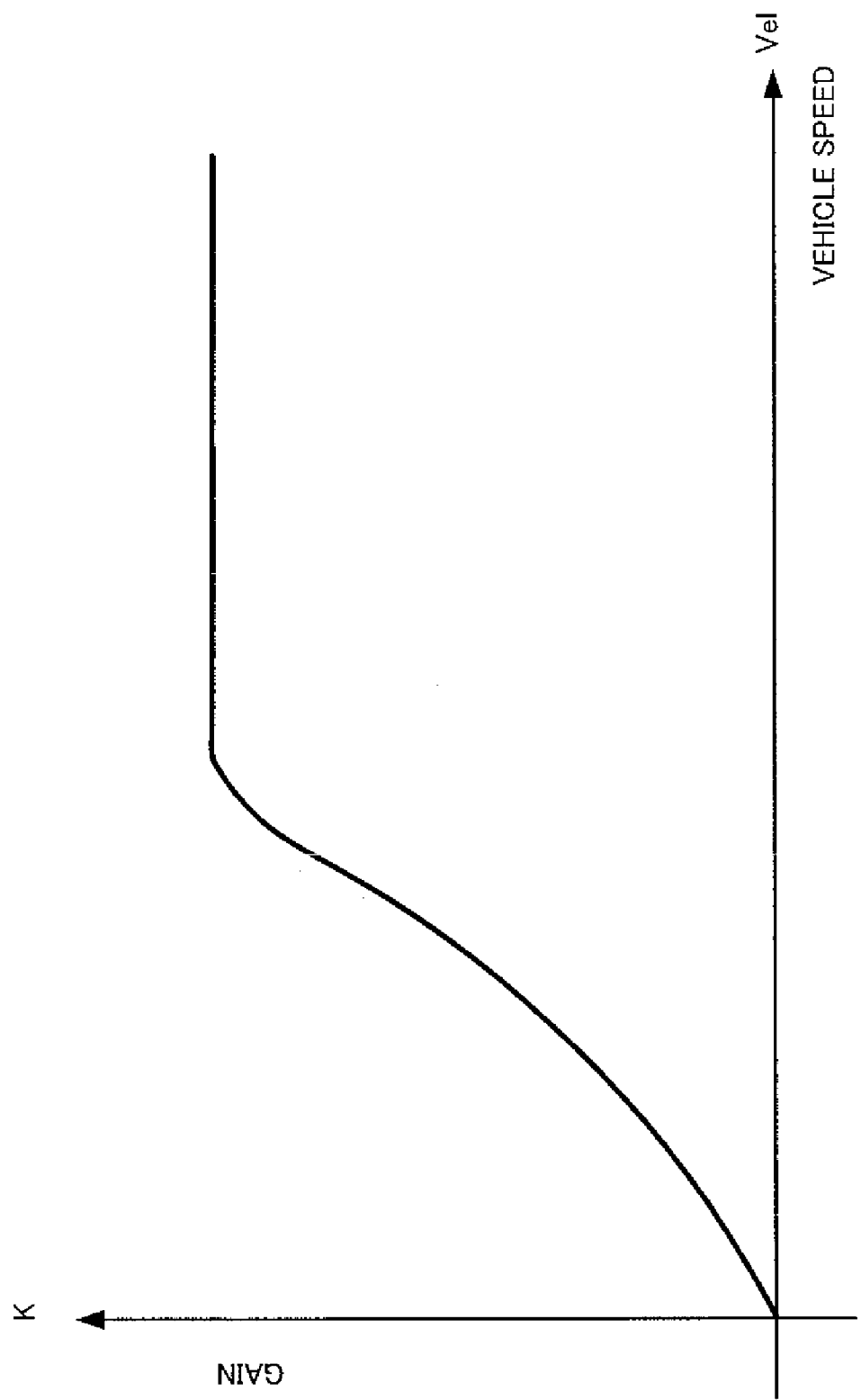
FIG. 5 is a diagram to show a characteristic example of a feedback filter.
Figure 7:
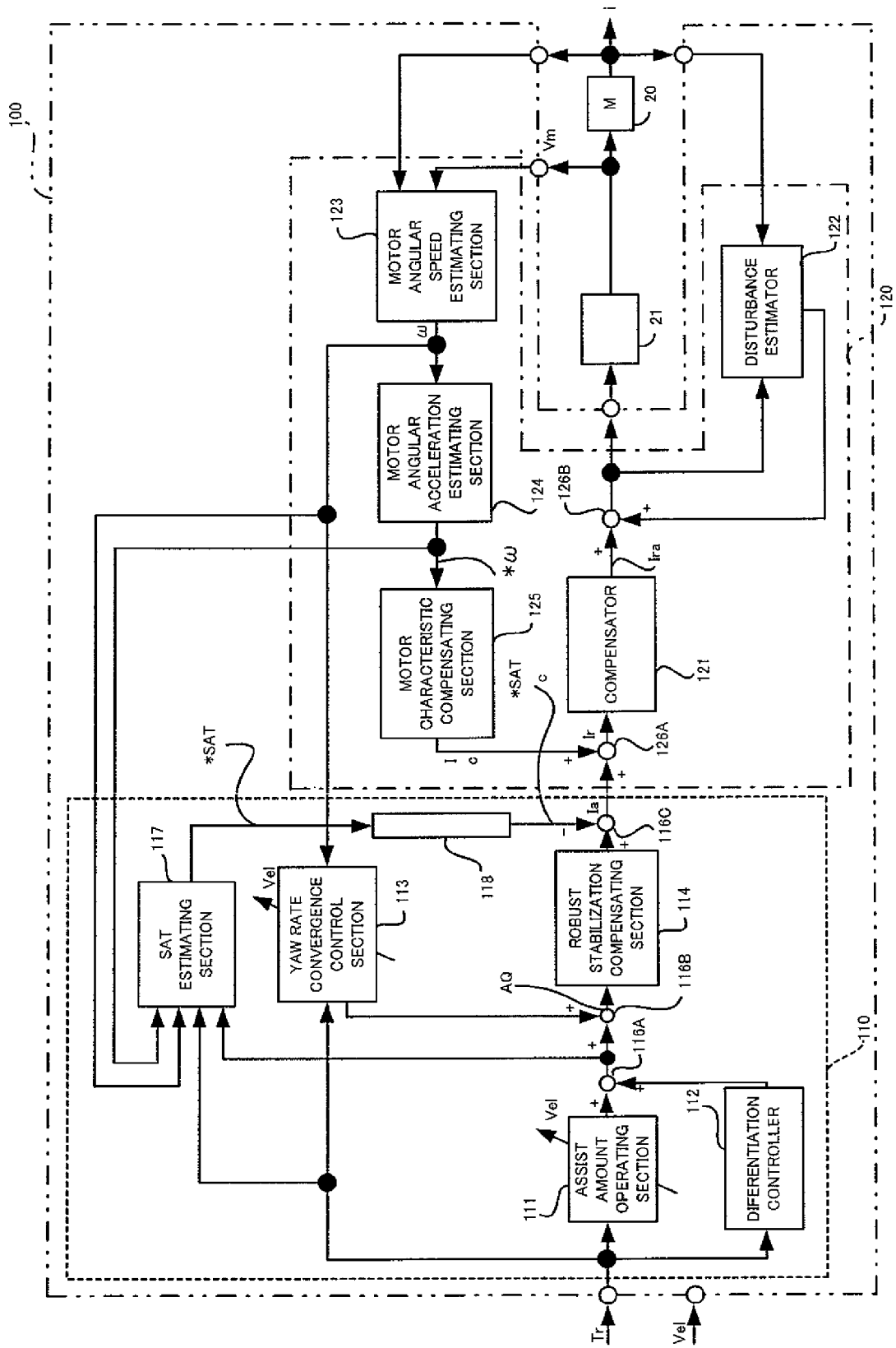
FIG. 7 is a block diagram to show a first embodiment of the present invention.

An embodiment (first embodiment) of the present invention is explained with reference to FIG. 7 related with FIG. 2. The similar or same members to those in FIG. 2 are designated by the same numbers, and the explanation thereof is omitted.

Figure 8:
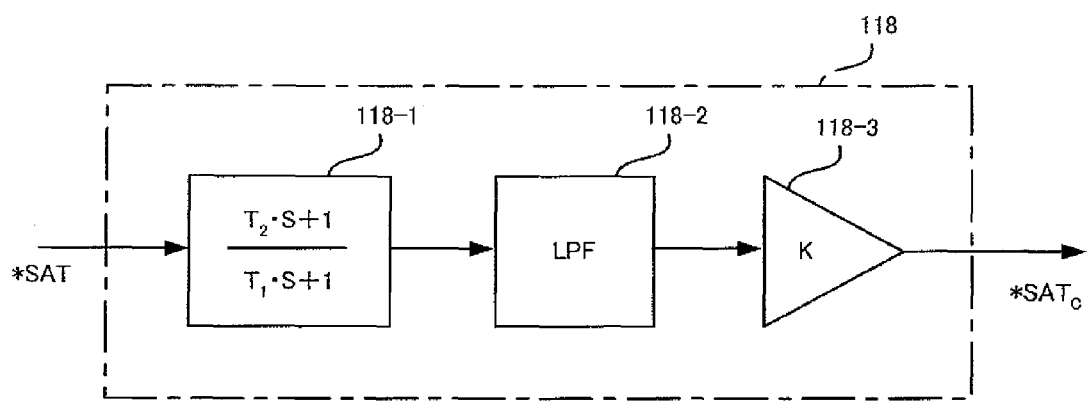
FIG. 8 is a block diagram to show a constitutional example of a feedback section to be used in the present invention.

In the present invention, an SAT estimating section 117 inputs a steering torque signal Tr, an angular speed ω, an angular acceleration *ω and an added result of an adder 116A (assist amount operated result) therein so as to estimate an SAT, and feedbacks the estimated SAT value *SAT via a feedback section 118 to an adder 116C. A constitution of the feedback section 118 is as shown in FIG. 8, for example. That is to say, the feedback section 118 is composed of a phase-lead compensating section 118-1 as a phase compensating section that inputs the estimated SAT value *SAT therein so as to carry out a phase-delay compensation, a low pass filter 118-2 that eliminates the disturbance and noise, and a gain section 118-3 that multiplies a gain K.

In such a constitution, the SAT estimating section 117 inputs the steering torque signal Tr, the angular speed ω, the angular acceleration *ω and the added result of the adder 116A therein so as to estimate the SAT, but the estimation is performed according to the above equation (2). The estimated SAT value *SAT is inputted to the phase-lead compensating section 118-1 in the feedback section 118, and thus a delay of the steering transmission system is compensated.

The phase-lead compensating section 118-1 is expressed as $(T_2 \cdot s + 1)/(T_1 \cdot s + 1)$ where "s" is a Laplace operator by a transfer function. The estimated SAT value *SAT, whose phase delay is compensated by the phase-lead compensating section 118-1, is inputted to the low pass filter 118-2 that eliminates the disturbance and the noise, and the estimated SAT value *SAT where high and intermediate frequency components are eliminated is multiplied by a gain K in the gain section 118-3, so as to output as an estimated SAT value *SATc. The estimated SAT value *SATc is added to an output of the robust stabilization compensating section 114 by the adder 116C, so that the added value is inputted to a motor system control section 120.

As explained above, in the present invention, the delay of the steering transmission system is compensated by performing the phase-lead compassion on the estimated SAT value *SAT, and when the SAT is feedbacked without delay, the linearity is generated in the steering force, so that the steering feeling (direct feeling and the sense of unity) is improved and the traveling characteristics on the low-friction road are improved. Further, the low pass filter 118-2 is not always necessary, but when the influences of unnecessary disturbance and noise cannot be ignored at the time when the phase-lead compensating section 118-1 compensates a delay, the unnecessary disturbance and noise can be eliminated by disposing the low pass filter 118-2. Actually, since the road information such as shimmy and flutter which are not desired to be received by a driver has high frequency, the disposing of the low pass filter 118-2 is effective.

On the other hand, since the SAT characteristic and the characteristic of the road information which are not desired to be received by a driver change at the time of a low-speed traveling, an intermediate-speed traveling or a high-speed traveling of the vehicle, the characteristics may be changed according to the vehicle speed signal Ve1. That is, a vehicle speed sensitive type feedback section may be constituted.

Figure 9:
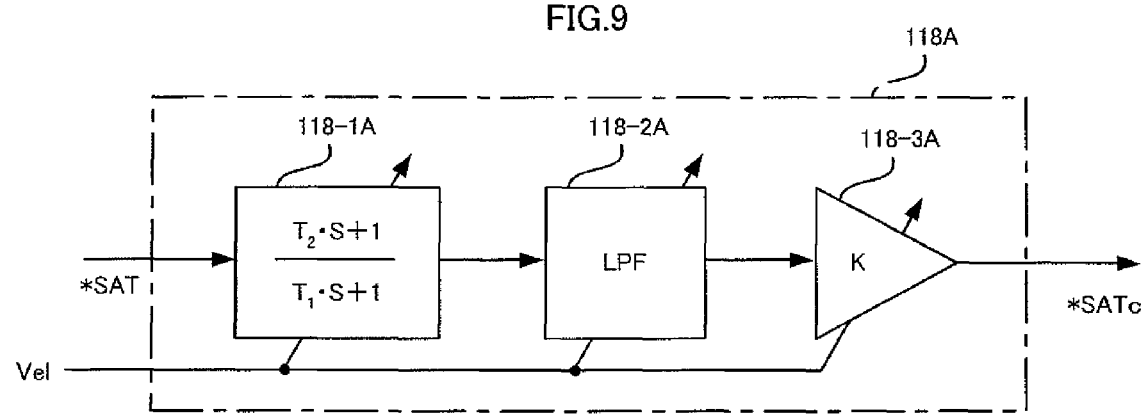
FIG. 9 is a block diagram to show another constitutional example of the feedback section to be used in the present invention.

FIG. 9 shows a constitutional example of the feedback section 118A in the above case, and the vehicle speed sensitive type feedback section is such that the phase-lead compensating section 118-1A, the low-pass filter 118-2A and the gain section 118-3A being inputted the vehicle speed signal Ve1 therein, and the respective sections automatically change the characteristics according to the vehicle speed. Since the SAT increases in an intermediate speed range, for example, the phase lead of the phase-lead compensating section 118-1A is increased in the intermediate speed range, and since the unnecessary disturbance and noise increase in a high speed range, a cut-off frequency of the low pass filter 118-2A is reduced. Further, since the SAT feedback is not much necessary in a low speed range, the gain K of the gain section 118-3A is reduced.

The vehicle speed sensitive type feedback section 118A may be constituted so that two types of the phase-lead compensating sections 118-1A are prepared for the intermediate speed and another speed, two types of the low pass filters 118-2A are prepared for the low speed and another speed, and two types of the gain sections 118-3A are prepared for the high speed and another speed so as to detect high, intermediate and low areas of the vehicle speed signal Ve1, and the respective sections may be switched.

Although the SAT estimating section 117 estimates the SAT in the above embodiment, the SAT may be measured by a sensor. Only the gain section (118-3, 118-3A) may be of torque sensitive type. As a result, comfortable steering feeling can be obtained.

According to the present invention, the SAT estimating section that estimates an SAT or the SAT measuring section that measures it using a sensor is provided, and the estimated SAT value estimated by the SAT estimating section or the SAT value measured by the SAT measuring section is feedbacked to the steering assist command value via the feedback section composed of the phase-lead compensating section and the gain section, so that the signal process can be executed on the road information, disturbance or the like in the frequency area without a delay. For this reason, a control equivalent to the case where the SAT is estimated can be made, and a safe and comfortable steering performances which prove an easy tuning can be obtained. Further, when the low pass filter is disposed in the feedback section, influences of the unnecessary disturbance and noise can be eliminated.

Further, since the phase-lead compensating section, the low pass filter and the gain section in the feedback section are sensitive to a vehicle speed signal so as to be changed, a more safe and comfortable steering performance can be obtained. For example, since the SAT becomes large in the intermediate speed range, the phase lead of the phase-lead compensating section is increased in the intermediate speed range, since the unnecessary disturbance and noise increase in a high speed range, the cut-off frequency of the low pass filter is decreased, and since the SAT feedback is not much necessary in a low speed range, the gain of the gain section is reduced. For this reason, more comfortable steering feeling can be obtained.

In the present invention, a high pass filter is inserted into the estimated SAT value, so that a rack reaction force to be inputted from the outside is estimated (estimated SAT value), the motor is controlled so that a reaction force which is not desired to be transmitted to the driver is canceled, and the brake judder and shimmy are suppressed in such a manner. Since the estimated SAT value is positively canceled as disturbance, the steering feeling is improved. Further, a phase-lead element may be inserted in order to compensate the delay, and since the characteristic of the SAT and the characteristic of the road information which are not desired to be transmitted to the driver change due to a vehicle speed (high, intermediate, low), the feedback characteristic may be changed according to the vehicle speed.

Figure 10:
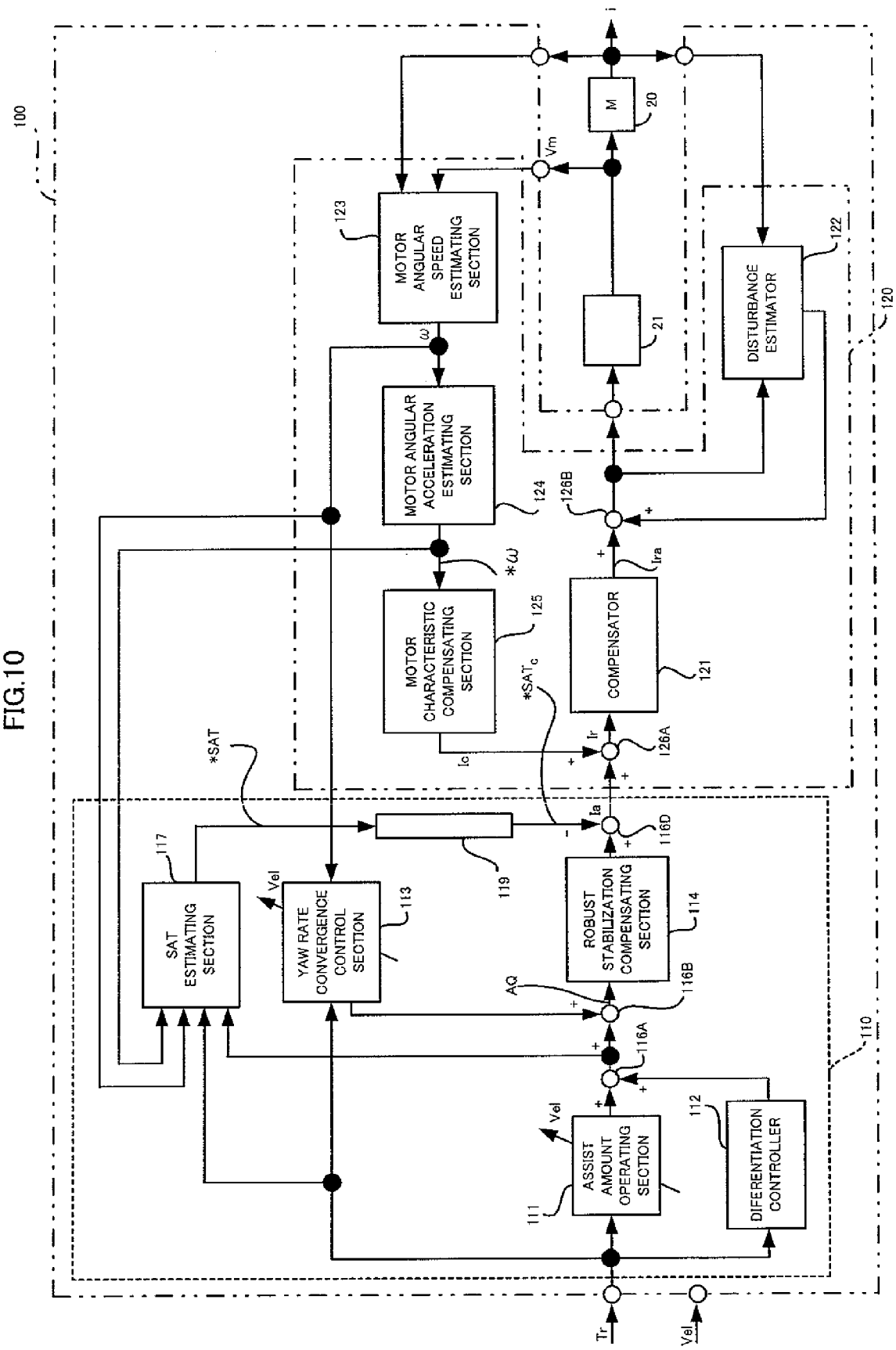
FIG. 10 is a block diagram to show a second embodiment of the present invention.

An embodiment (second embodiment) of the present invention is explained with reference to FIG. 10 related with FIG. 7. The similar or same members to those in FIG. 7 are designated by the same numbers, and the explanation thereof is omitted.

Figure 11:
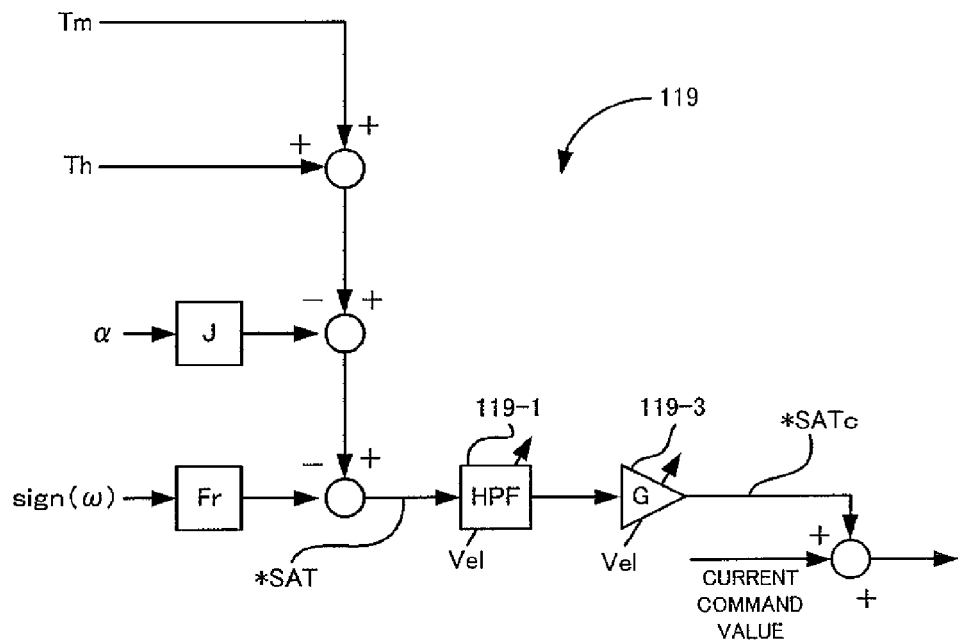
FIG. 11 is a block diagram to show a constitutional example of a feedback section to be used in the present invention.

In the present invention, an SAT estimating section 117 inputs a steering torque signal Tr, an angular speed ω, an angular acceleration *ω and an added result in an adder 116A (assist amount operated result) therein so as to estimate the SAT, and adds the estimated SAT value *SAT via a feedback section 119 to the adder 116C. A constitution of the feedback section 119 is as shown in FIG. 11, for example. That is, the feedback section 119 is composed of a vehicle speed sensitive-type high pass filter 119-1 that inputs the estimated SAT value *SAT therein and outputs a high-frequency component, and a vehicle speed sensitive-type gain section 119-3 that multiplies a gain G. The high-pass filter 119-1 can be composed of a transfer function including a high-pass filter characteristic.

In such a constitution, the SAT estimating section 117 inputs the steering torque signal Tr, the angular speed ω, the angular acceleration *ω and the added result in the adder 116A therein so as to estimate the SAT, but the estimation is performed according to the above equation (2). The estimated SAT value *SAT is inputted to the high pass filter 119-1 in the feedback section 118, and thus only a high-frequency component relating to brake judder and shimmy passes therethrough, so that the brake judder and shimmy can be suppressed. An output of the high pass filter 119-1 through which only the high-frequency component passes is inputted to the gain section 119-3, and the output is multiplied by a gain G, so as to output as the estimated SAT value *SATc. The estimated SAT value *SATc is added to an output (current command value) of a robust stabilization compensating section 114 by an adder 116D, and the added value is inputted to the motor system control section 120.

Conventionally (Japanese Patent Application Laid-open No. 2002-369565 A), although the Q filter (phase delay) is inserted so that the disturbance is prevented from being diffused at the time of the feedback, and thus the motor does not amplify uncomfortable vibration from a road surface, this does not mean that the uncomfortable vibration (brake judder and shimmy) is canceled. For this reason, in the present invention, the estimated SAT value *SAT as an estimated reaction force value is allowed to pass through the high pass filter 119-1, and a reaction force component which is not desired to be transmitted to the driver is extracted and is added to the current command value so that a correction is made. As a result, the reaction force component which is not desired to be transmitted to the driver can be canceled. When the estimated SAT value *SAT is directly added, satisfactory suppression cannot be carried out, and thus the estimated SAT value *SAT is multiplied by the gain G so as to be added. Further, the estimated SAT value *SAT may be subjected to the phase compensation. Further, when the influences of the unnecessary disturbance and noise cannot be ignored, the low pass filter is disposed so as to be capable of eliminating the unnecessary disturbance and noise.

Further, since the SAT characteristic, the uncomfortable vibration and the characteristic of the road information which are not desired to be received by the driver change according to a rotation number (speed) of tires at the time of a low-speed traveling, an intermediate-speed traveling or a high-speed traveling of the vehicle, the filter characteristic and the gain G may be switched according to the vehicle speed signal Vel. That is, a vehicle speed sensitive-type feedback section may be constituted. In this case, a cut-off frequency of the high pass filter 119-1 is heightened and the gain G is increased at the time of the high speed, and the cut-off frequency of the high pass filter 119-1 is reduced and the gain G is reduced at the time of the low speed. In such an active vibration control, the control system should be designed suitably or vibration is heightened. For this reason, a signal from an external controller (for example, an ABS controller) is utilized, and a correction may be made only when a vibration is easily generated due to braking at the time of the high-speed traveling or the like.

As explained above, in the present invention, the high pass filter 119-1 is inserted into the estimated SAT value *SAT, and the gain is adjusted by the gain section 119-3 so that the SAT is feedbacked. For this reason, the brake judder and shimmy can be suppressed.

Figure 12:
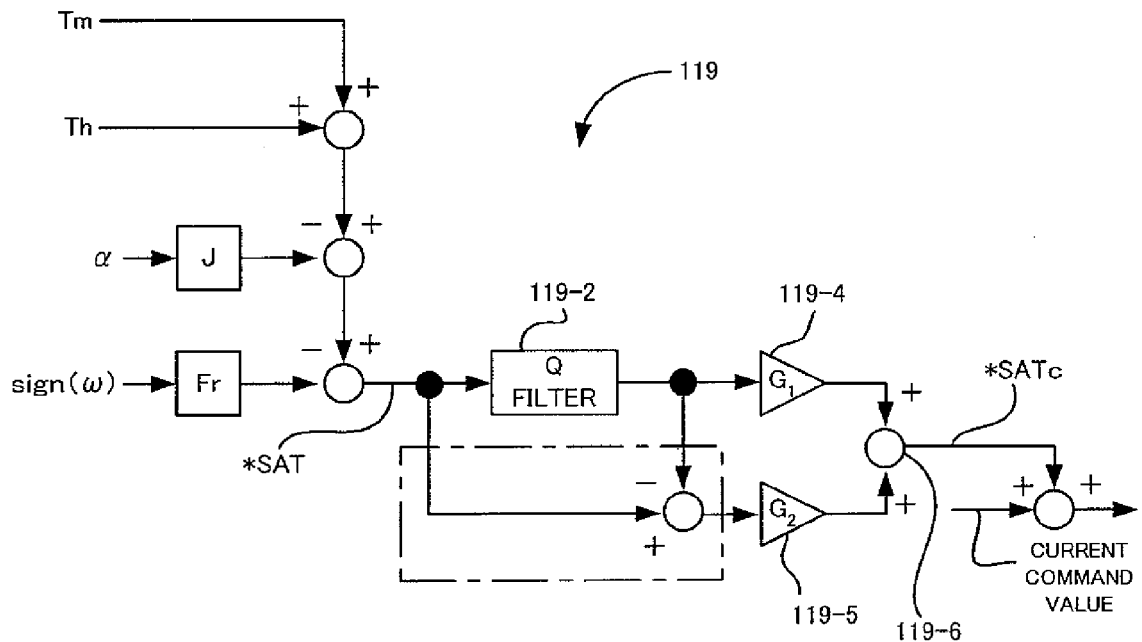
FIG. 12 is a block diagram to show another constitutional example of the feedback section to be used in the present invention.

FIG. 12 shows another constitutional example of the feedback section 119 according to the present invention. A system which is comprised the Q-filter 119-2 and the gain section (gain G1) 119-4 which are similar to conventional ones is connected to a system which is comprised the high pass filter 119-1 composed of input/output of the Q-filter 119-2 and the gain section (gain G2) 119-5 in parallel, and outputs of the respective systems are added by the adder 119-6 so that the added value is added to the current command value. According to the above example, an effect by the conventional correction of a low frequency and an effect based on the high pass filter 119-1 can be produced, namely, the road information which is not desired to be transmitted to the driver is suppressed, and the road information which is desired to be transmitted to the driver is maintained so that the comfortable steering feeling can be obtained.

Even in this example, the Q-filter 119-2, and the gain sections 119-4 and 119-5 can be of the vehicle speed sensitive type.

Although the SAT is estimated by the SAT estimating section 117 in the above embodiment, the SAT may be obtained by measuring it by a sensor.

Further, only the gain sections (119-3, 119-4 and 119-5) may be of torque sensitive type. As a result, the comfortable steering feeling can be obtained.

According to the present invention, the SAT estimating section that estimates the SAT or the SAT measuring section that measures it using a sensor is provided, and the estimated SAT value estimated by the SAT estimating section or the SAT value measured by the SAT measuring section is added to the steering assist command value via the feedback section comprised the high pass filter and the gain section, so that a signal process can be executed on the road information, the disturbance or the like in the high frequency area. For this reason, the brake judder and shimmy can be suppressed, and a safe and comfortable steering performances which prove easy tuning can be obtained.

Further, not only the brake judder and shimmy but also behavior of the steering wheel such as kickback can be reduced, so that the comfortable steering feeling can be provided.

Figure 6:
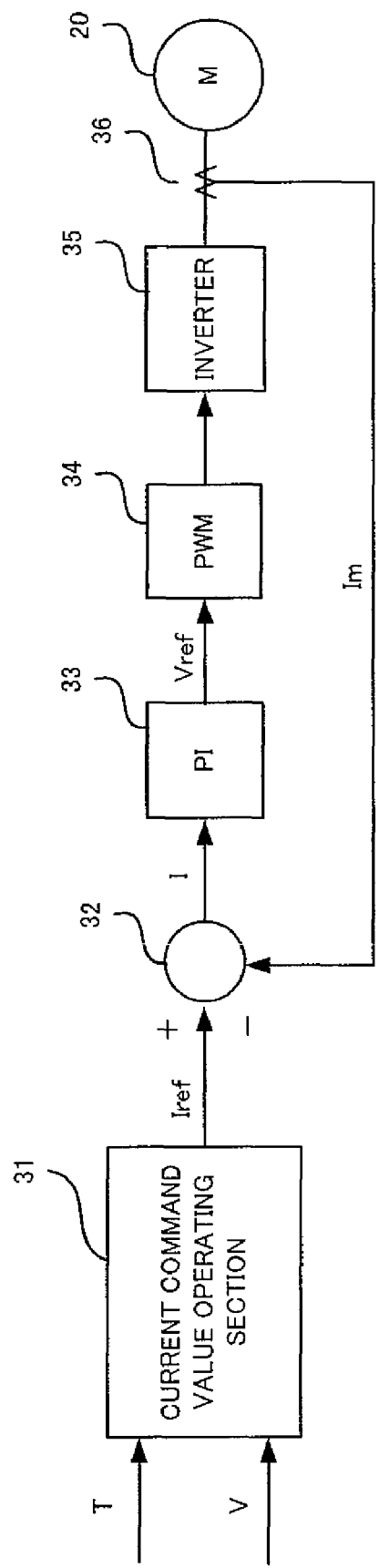
FIG. 6 is a block diagram to show an example of a structure of a control unit.
Figure 13:
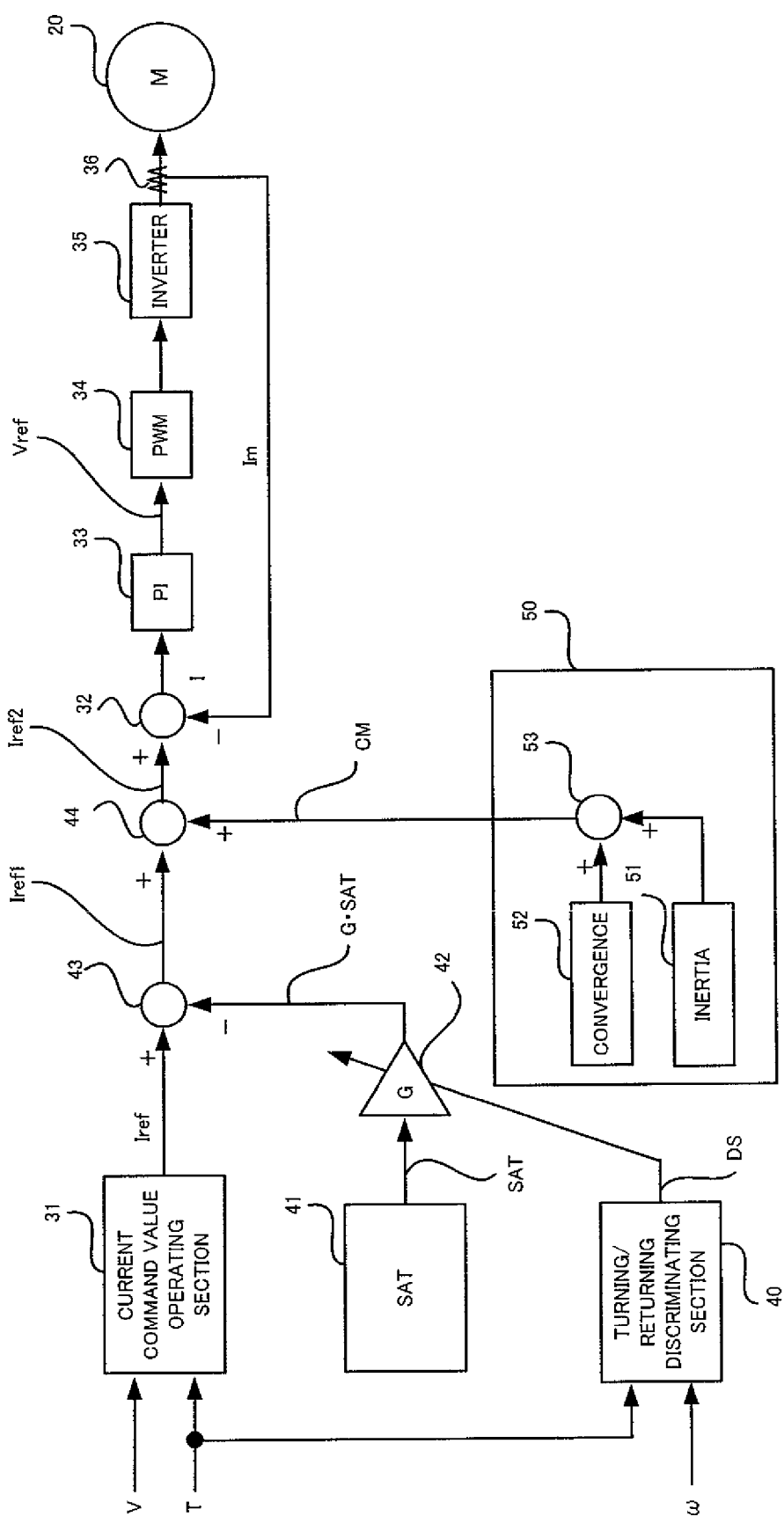
FIG. 13 is a block diagram to show a structure of a third embodiment of the present invention.

FIG. 13 shows an embodiment (third embodiment) of the present invention so as to correspond to FIG. 6. A steering torque value T from a torque sensor is inputted to a current command value operating section 31 and a turning/returning discriminating section 40. The vehicle speed V from the vehicle speed sensor is inputted to the current command value operating section 31. A current command value Iref operated in the current command value operating section 31 is inputted to a subtracter 43. To the turning/returning discriminating section 40, inputted is a measured or estimated angle speed $\omega$. A discrimination signal DS discriminated in the turning/returning discriminating section 40 is inputted to a gain section 42. An SAT measured or estimated in an SAT section 41 is increased G-times (G·SAT) in the gain section 42 to be inputted to the subtracter 43. A result of the subtraction in the subtracter 43 (Iref-G·SAT) is inputted to an adder 44 as the current command value Iref. To the adder 44, also inputted is a compensation signal CM from a compensating section 50 for improving a specific property.

The compensating section 50 adds an inertia 51 and a convergence 52 in the adder 53 to input a result of the addition to the adder 44 as the compensation signal CM. The result (Iref1+CM) of the addition in the adder 44 is inputted to the subtracter 32 as a current command value Iref2 to be used for controlling the motor 20 through a PI controlling section 33, a PWM controlling section 34 and an inverter 35.

Figures 14, 15:
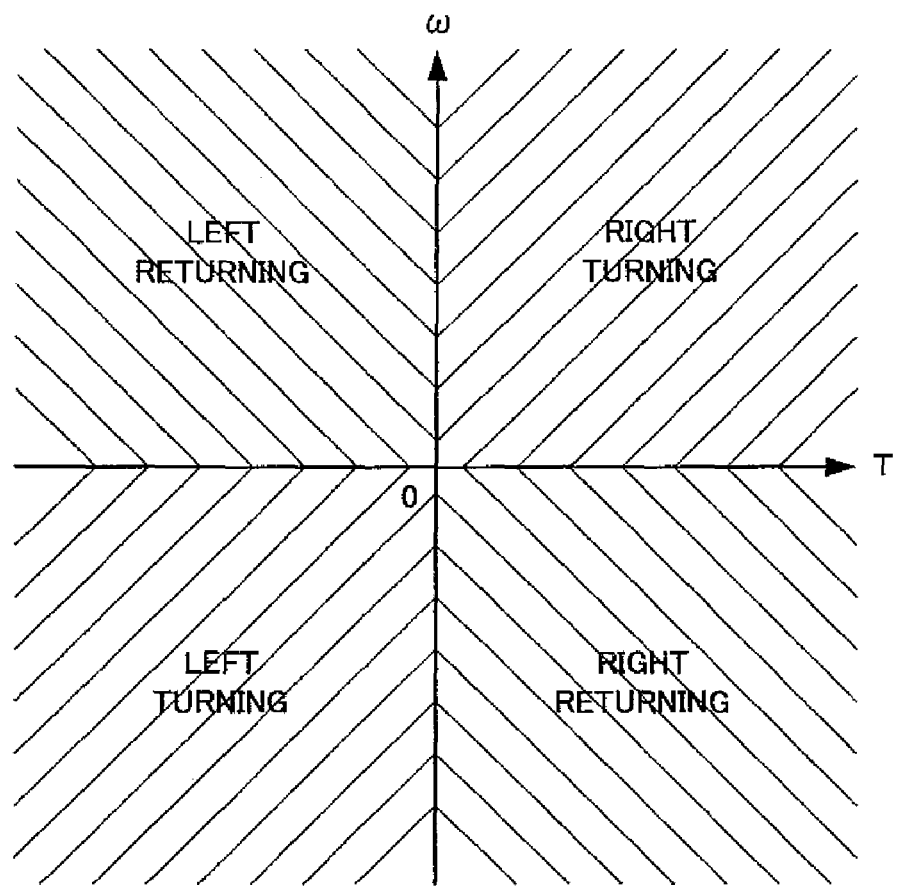
FIG. 14 illustrates an example of discrimination of turning and returning in the present invention.
FIG. 15 illustrates an example of gain in a gain section.

The turning/returning discriminating section 40 discriminates that the steering wheel is in a turning state when signs of the steering torque value T and the angle speed $\omega$ are same while it discriminates that the steering wheel is in a returning state when the signs of the steering torque value T and the angle speed $\omega$ are different, as shown in FIG. 14, to output the determination signal DS of the two values (for turning and returning states). Further, as described in Japanese Patent Application Laid-open No. 2003-170856 A, it may be discriminated that the steering wheel is in a turning state in the case that the signs of the steering torque value T and a steering torque changing ratio are same and an absolute value of the steering torque changing ratio is a predetermined value or more while it is discriminated that the steering wheel is in a returning state in the case that signs of the steering torque value T and the steering torque changing ratio are different and the absolute value of the steering torque changing ratio is a predetermined value or more. That is, the turning and returning states can be discriminated only on the basis of the steering torque value T without using the angle speed $\omega$.

Moreover, the SAT may be estimated by means of an external disturbance observer structure on the basis of a motor rotation signal and a motor current command value, as disclosed in Japanese Patent Application Laid-open No. 2002-274405 A, for example.

In such a structure, the motor 20 is controlled on the basis of the current command value Iref operated in the current command value operating section 31. In the present invention, however, the current command value Iref1 (=Iref−G·SAT) is obtained by subtracting the self-aligning torque "G·SAT", which is obtained by increasing the self-aligning torque SAT which is being gain G-times in the gain section 42, from the current command value Iref while the current command value Iref1 (=Iref1+CM) is obtained by adding the compensation signal CM to the current command value Iref1. The gain G of the gain section 42 is switched in accordance with the discrimination signal DS of the turning/returning discriminating section 40. A plus gain G is given in the case of returning while a minus gain G is given in the case of turning, in accordance with the discrimination signal DS of two values. That is, the gain in turning is set to "0" when the gain in returning is "−1.0" while the gain in turning is set to "+0.2" when the gain in returning is "−0.8", as shown in FIG. 15. Accordingly, when the steering wheel is returned too much, a minus gain is multiplied only in returning, and thus, the power steering operates to brake the returning of the steering wheel caused by the road surface reaction force. In the case of turning, the steering power is reduced since a plus gain is multiplied before subtraction.

Figure 16:
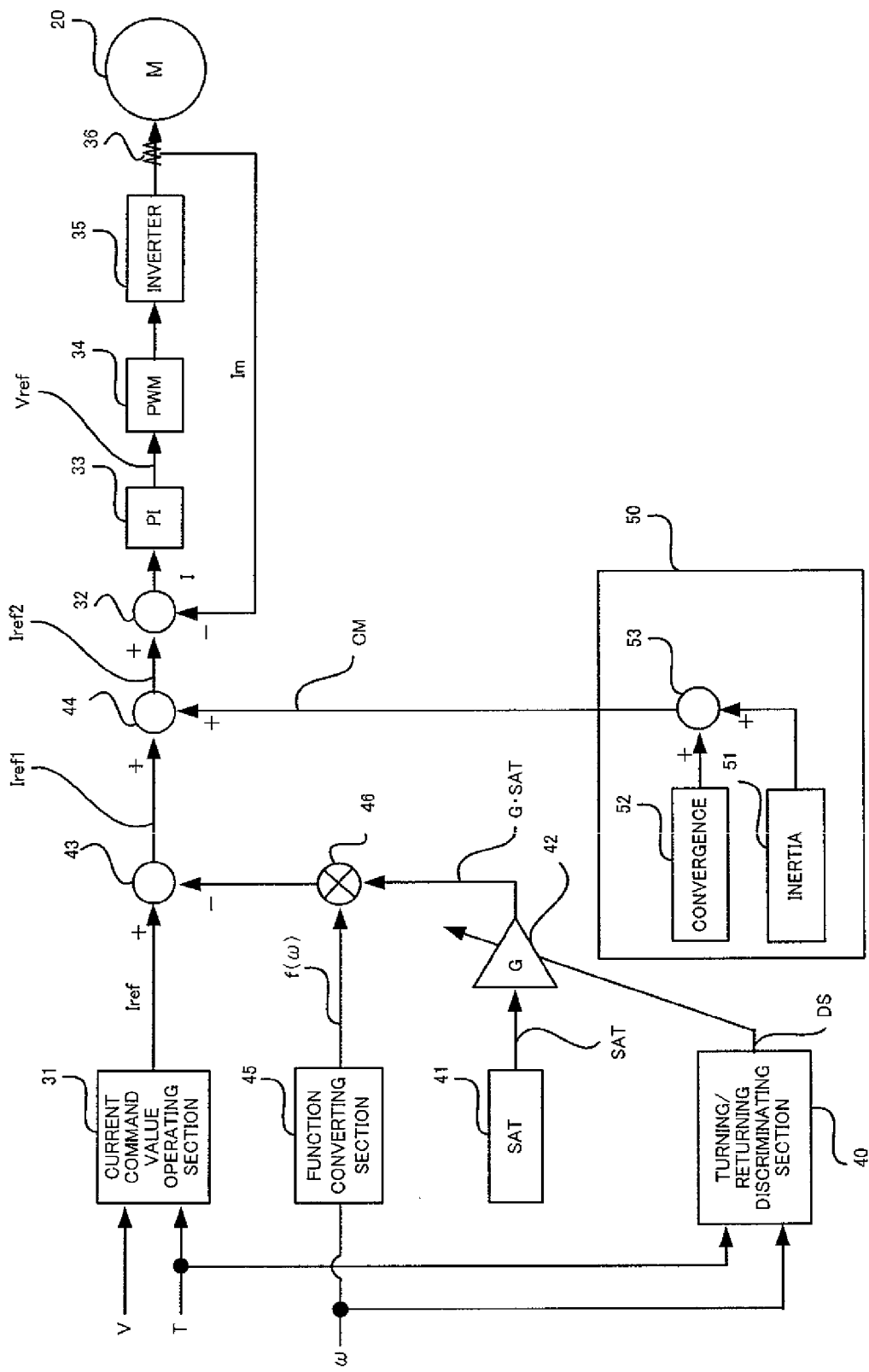
FIG. 16 is a block diagram to show a structure of a fourth embodiment of the present invention.
Figure 17:
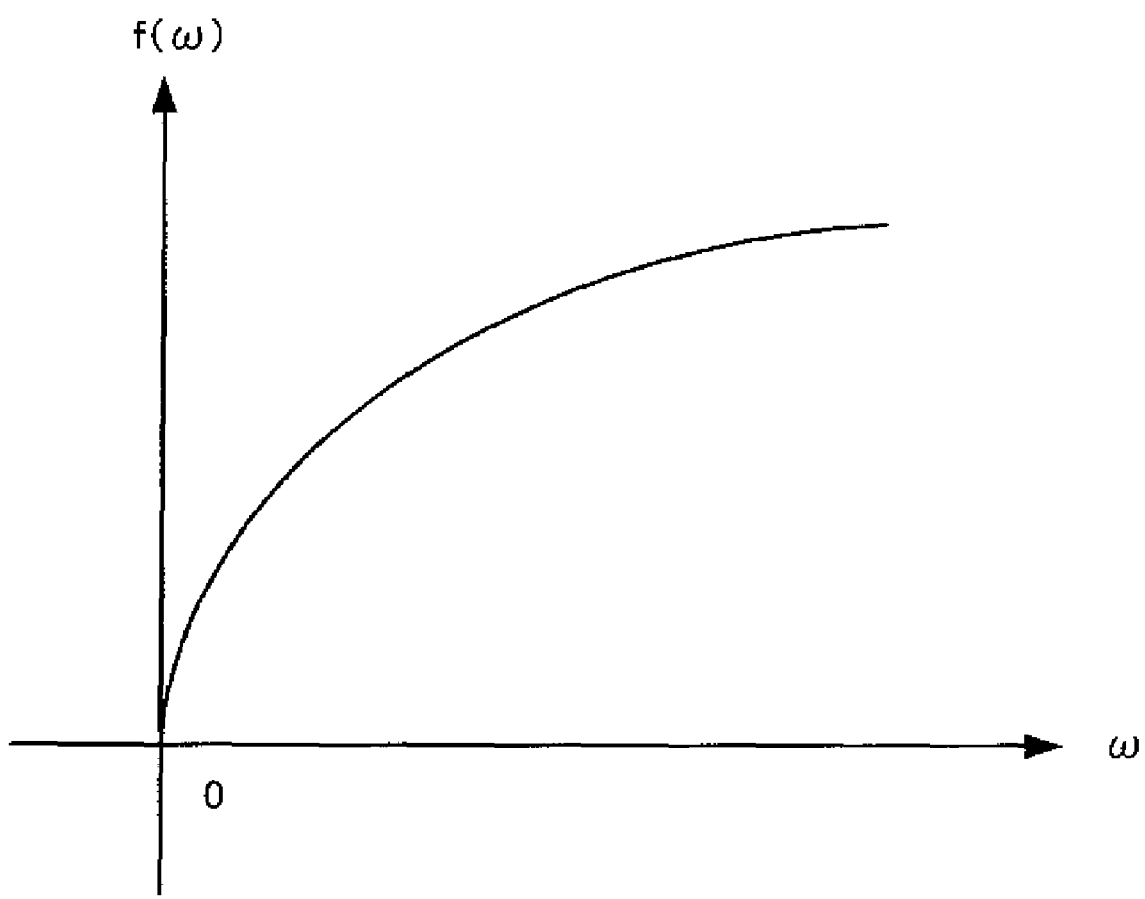
FIG. 17 illustrates an example of a specific property of a function converting section.

FIG. 16 shows another embodiment (forth embodiment) of the present invention so as to correspond to FIG. 13. The problem to be solved is sudden rotation of the steering wheel due to the excessively strong road surface reaction force. For the purpose of solving the problem, a function converting section 45 for the angle speed ω is provided in FIG. 16 so that the function-converted angle speed f(ω) would be multiplied by the compensation value "G·SAT" of the self-aligning torque SAT in the multiplying section 46 to be inputted to the subtracter 43. In this case, a specific property of the function converting section 45 is a first-order lag function as shown in FIG. 17, so that the large gain in high-speed rotation operates as a brake while the gain is made small in low-speed rotation for the purpose of preventing the unnecessary assist torque from being generated. This is because the road surface reaction force is considered to be small in a low-speed rotation although the driver holds the steering wheel by his or her hands.

In such a structure, the self-aligning torque SAT is increased gain G-times in accordance with a discrimination result of the turning/returning discriminating section 40 and the self-aligning torque "G·SAT" is inputted to the multiplying section 46, similarly to the embodiment in FIG. 13. The angle speed ω is function-converted f(ω) in the function converting section 45 to be inputted to the multiplying section 46 and the angle speed is multiplied by the self-aligning torque "G·SAT" from the gain section 42 to be inputted to the subtracter 43. In the subtracter 43, an output of the multiplying section 46 (=G·SAT·f(ω)) is subtracted from the current command value Iref1 to generate the current command value Iref1 while the compensation signal CM from the compensating section 50 is added to the current command value Iref1 in the adder 44 to generate the current command value Iref2 (=Iref1+CM).

As described above, in accordance with the embodiment, the SAT compensating value is multiplied by the gain f(ω) responding to the steering speed (ω). Accordingly, the large gain in a high-speed rotation can operate as a brake while the small gain in a low-speed rotation prevents the unnecessary assist torque from being generated. Further, the steering torque is small when the returning of the steering wheel in running on a low friction road or the like is small in force. This allows a good balance and a good steering feeling to be achieved.

The function in the function converting section may be a linear function although it is a first-order lag function in the above embodiments.

According to the present invention, the SAT is increased gain-times by means of plus or minus gain in accordance with a result of discrimination of turning or returning of the steering wheel so that the signal thereof would be subtracted form the current command value. This allows the returning of the steering wheel due to the road surface reaction force to be braked, so that the steering wheel does not excessively return. Thus, a power steering apparatus with a high performance can be achieved.

In accordance with the control apparatus for an electric power steering apparatus according to the present invention, a control is performed so that multiplying a minus gain only in returning of a steering wheel would allow the returning of the steering wheel, which is caused by the road surface reaction force, to be braked by means of the power steering, so that the steering wheel does not return excessively. Further, it is arranged that a large gain operate as a brake in a high-speed rotation while a small gain prevent the unnecessary assist torque from being generated in a low-speed rotation. This causes no sudden rotation of a steering wheel due to excessively strong road surface reaction force.

In the present invention, the SAT is taken into account to control returning of the steering wheel, so that a good steering feeling can be achieved not only in a small-sized automobile but also in a large-sized automobile.

In a fifth example of the present invention, when a steering angle response gain and/or a steering torque response gain are/is provided, at the time of on-center where the self-aligning torque (SAT) is small (steering torque is small/steering angle is small) and at the time of off-center where the self-aligning torque is large (steering torque is large/steering angle is large), suitable SAT compensating values can be set. In the present invention, a steering state (turning steering, returning steering, steering holding) is determined, so that the SAT compensating value can be set at the time of the steering holding state. In other words, in the fifth example of the present invention, the SAT compensating values are suitably set at the time of on-center, off-center and steering holding states by using the determined result of the steering state (turning steering, returning steering, steering holding), a steering angular speed signal, a steering torque signal and a steering angle signal.

Figure 18:
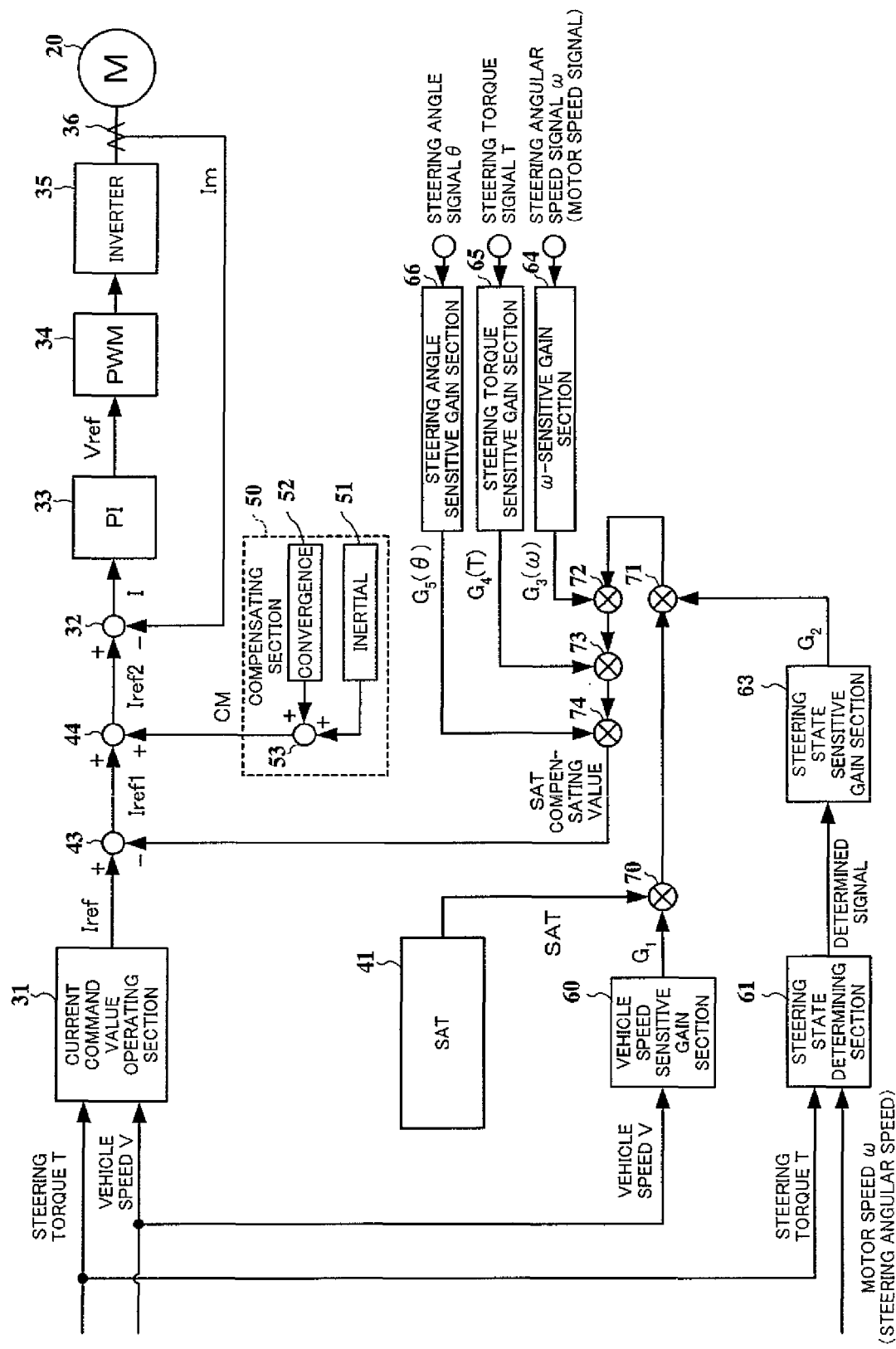
FIG. 18 is a block diagram to show a structure of a fifth embodiment of the present invention.

The example of the present invention in FIG. 18 is related with FIG. 13, a steering torque value T from the torque sensor (not shown) is inputted to a current command value operating section 31 and also to a steering state determining section 61. A vehicle speed V from a vehicle speed sensor (not shown) is inputted to the current command value operating section 31 and also to a vehicle speed sensitive gain section 60. A current command value Iref, which is operated by the current command value operating section 31 based on the steering torque value T and the vehicle speed V, is inputted to a subtracter 43.

A self-aligning torque SAT, which is detected or estimated by an SAT section 41, is inputted to a multiplying section 70. The vehicle speed sensitive gain section 60 sets a vehicle speed sensitive gain $G_1$ based on the vehicle speed V. Also a vehicle speed sensitive gain $G_1$ from the vehicle speed sensitive gain section 60 is inputted to the multiplying section 70. An output "SAT·$G_1$" of the multiplying section 70 is inputted to a multiplying section 71.

On the other hand, a measured or estimated steering angular speed ω (motor speed) is inputted to the steering state determining section 61. The steering state determining section 61 determines the steering state (turning steering, returning steering or steering holding) based on the steering torque value T and the steering angular speed ω, and outputs a determined signal (signal representing the steering state) as a determined result to a steering state sensitive gain section 63.

The steering state sensitive gain section 63 switches a steering state sensitive gain $G_2$ based on the determined signal from the steering state determining section 61. Namely, the steering state sensitive gain $G_2$ which is outputted from the steering state sensitive gain section 63 to a multiplying section 71 is switched according to the determined signal from the steering state determining section 61.

FIG. 19 illustrates a specific example of the steering state sensitive gain $G_2$. The steering state sensitive gain section 63 determines patterns A to C shown in FIG. 19, for example.

(1) Pattern A:

This pattern A means that "the steering state sensitive gain $G_2$ is operated only at the time of a turning steering" in the following state. The steering state sensitive gain $G_2$ in the case where the turning steering is determined is set to a negative value (for example, the value of the steering state sensitive gain $G_2$ is set to "−1" or "−0.5"), the steering state sensitive gain $G_2$ in the case where the turning steering is determined is set to "0", and the steering state sensitive gain $G_2$ in the case where the steering holding is determined is set to "0".

(2) Pattern B:

This pattern B means that "the steering state sensitive gain $G_2$ is operated only at the time of a turning steering" in the following state. The steering state sensitive gain $G_2$ in the case where the turning steering is determined is set to "0", the steering state sensitive gain $G_2$ in the case where the turning steering is determined is set to a positive value (for example, the value of the steering state sensitive gain $G_2$ is set to "1" or "2"), and the steering state sensitive gain $G_2$ in the case where the steering holding is determined is set to "0".

(3) Pattern C:

In this pattern C, "the steering state sensitive gain $G_2$ is operated only at the time of a steering holding" in the following state. The steering state sensitive gain $G_2$ in the case where the turning steering is determined is set to "0", the steering state sensitive gain $G_2$ in the case where the turning steering is determined is set to "0", and the sensitive gain $G_2$ in the case where the steering holding is determined is set to a positive value (for example, the value of the steering state sensitive gain $G_2$ is set to "1" or "5").

The above-mentioned some patterns can be combined, and the value of the steering state sensitive gain G2 can be freely set.

An output "SAT·$G_1$·$G_2$" from the multiplying section 71 is inputted to a multiplying section 72. An ω-sensitive gain $G_3(\omega)$ set by an ω-sensitive gain section 64 is also inputted to the multiplying section 72. An output "SAT·$G_1$·$G_2$·$G_3(\omega)$" of the multiplying section 72 is inputted to a multiplying section 73. A steering torque sensitive gain $G_4(T)$ set by a steering torque sensitive gain section 65 is also inputted to the multiplying section 73. An output "SAT·$G_1$·$G_2$·$G_3(\omega)$·$G_4(T)$" of the multiplying section 73 is inputted to a multiplying section 74. A steering angle sensitive gain $G_5(\theta)$ set by a steering angle sensitive gain section 66 is also inputted to a multiplying section 74. An output "SAT·$G_1$·$G_2$·$G_3(\omega)$·$G_4(T)$·$G_5(\theta)$" of the multiplying section 74, namely, an SAT compensating value in the present invention is inputted to a subtracter 43. A subtracted result (Iref−SAT compensating value) from the subtracter 43, namely, (Iref−SAT·$G_1$·$G_2$·$G_3(\omega)$)·$G_4(T)$·$G_5(\theta)$) is inputted as a current command value Iref1 to an adder 44, and a compensating signal CM from a compensating section 50 for improving a characteristic is also inputted to the adder 44.

The compensating section 50 adds an inertia 51 and a convergence 52 using an adder 53, and inputs an added result as the compensating signal CM to the adder 44. An added result (Iref1+CM) in the adder 44 is inputted as a current command value Iref1 to a subtracter 32, and a motor 20 is controlled via a PI control section 33, a PWM control section 34 and an inverter 35.

Figure 20:
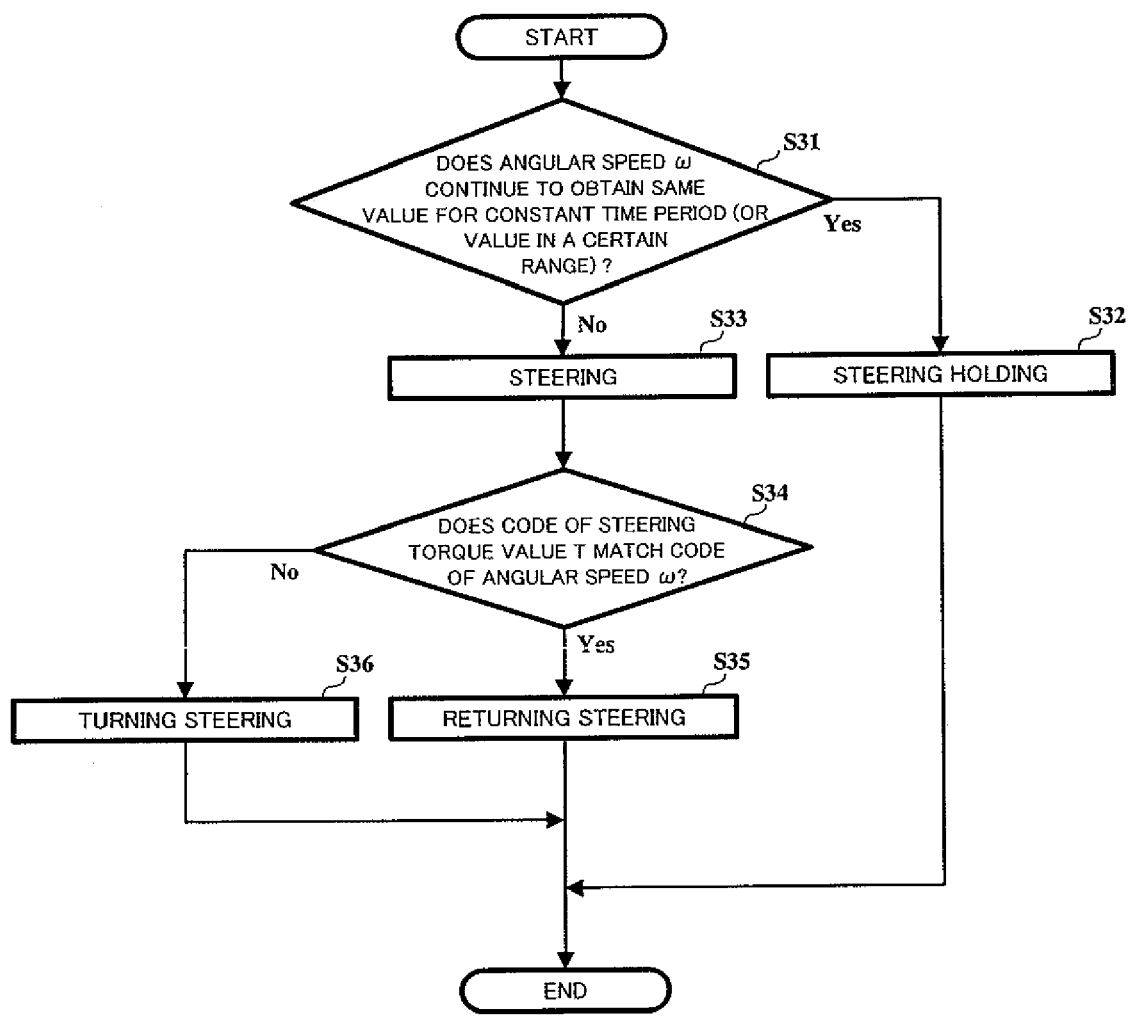
FIG. 20 is a flowchart for explaining an operation example of the steering condition judging section according to the present invention.

A steering state determining section 61 determines whether the steering angular speed ω obtains continuously the same value (or a value in a certain range) for a constant time period as shown in a flowchart of FIG. 20 (Step S31). When the determination is made that the same value continues, a steering holding is determined (Step S32). On the other hand, when the determination is made that the same value does not continue, a steering is determined (Step S33), and a determination is made whether a code of the steering torque value T matches a code of the steering angular speed ω (Step S34). When the determination is made that the code of the steering torque value T matches the code of the steering angular speed ω, the turning steering is determined (Step S35). On the other hand, when the code of the steering torque value T does not match the code of the steering angular speed ω, the returning steering is determined (Step S36).

In short, the steering state determining section 61 outputs ternary value (turning steering, returning steering, steering holding) determined signals to the steering state gain section 63 according to an operation shown in the flowchart of FIG. 20.

Further, in the case where the steering state determining section 61 does not determine the steering holding but determines only the turning steering and the returning steering, as described in Japanese Patent Application Laid-Open No. 2003-170856 A, when the code of the steering torque value T is identical to the code of a steering torque change rate and an absolute value of the steering torque change rate is not less than a predetermined value, the turning steering may be determined. When the code of the steering torque value T is different from the code of the steering torque change rate and the absolute value of the steering torque change rate is not less than a predetermined value, the returning steering may be determined. That is to say, the steering state determining section 61 can determine the turning steering and the returning steering using only the steering torque value T without using the steering angular speed ω.

In the SAT section 41, the self-aligning torque SAT may be estimated by a disturbance observer structure using a motor rotation signal and a motor current command value as described in, for example, Japanese Patent Application Laid-Open No. 2002-274405 A.

Figure 21A:
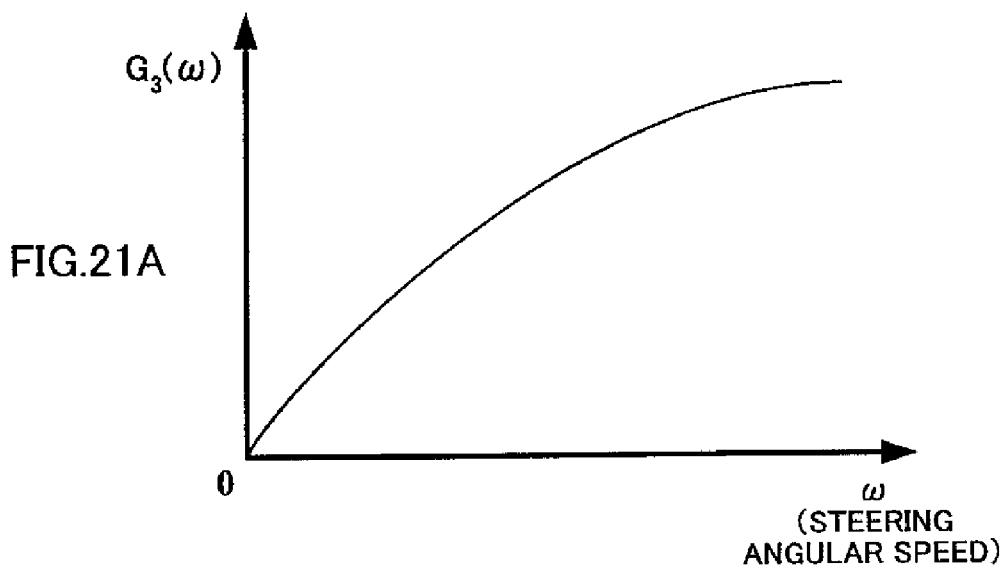
FIGS. 21A to 21C are charts showing respective concrete example of gains set by an ω-sensitive gain section, a steering torque sensitive gain section, a steering angle sensitive gain section.
Figure 21B:
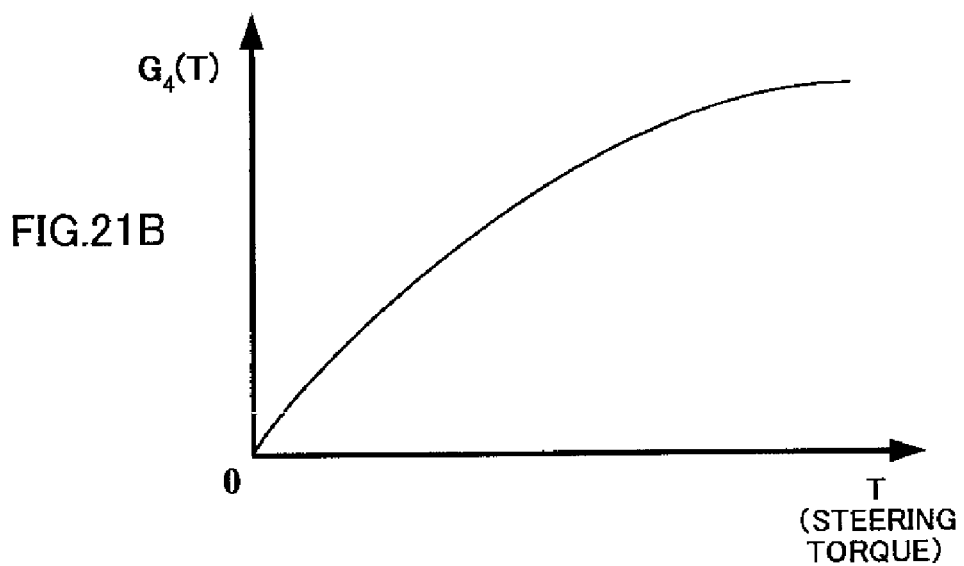
Figure 21C:
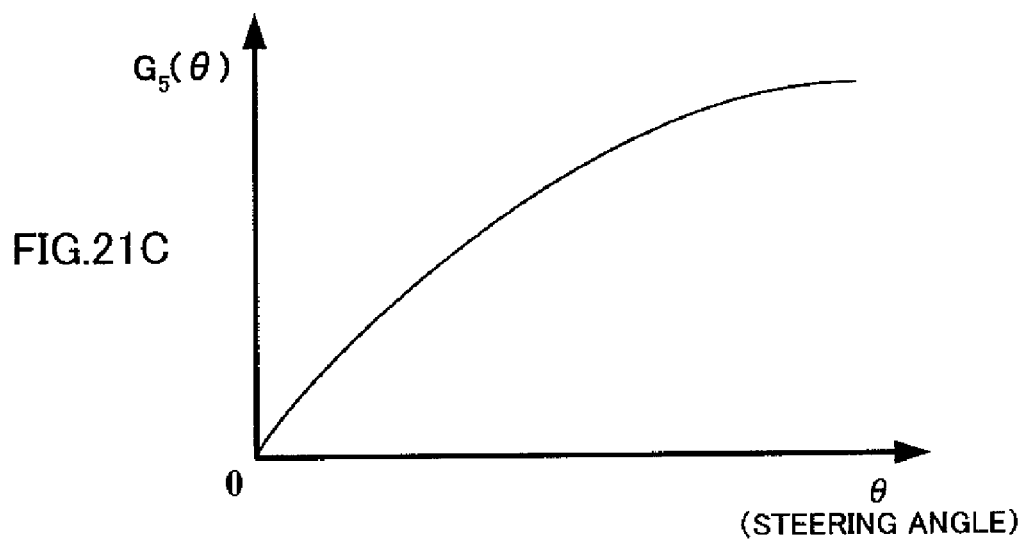

Further, the ω-sensitive gain section 64 sets the ω-sensitive gain $G_3(\omega)$ based on the steering angular speed signal ω. A specific example of the ω-sensitive gain $G_3(\omega)$ includes a primary delay function $G_3(\omega)$ of the steering angular speed signal ω shown in FIG. 21A, for example. The steering torque sensitive gain section 65 sets the steering torque sensitive gain $G_4(T)$ based on the steering torque signal T. A specific example of the steering torque sensitive gain $G_4(T)$ includes a primary delay function $G_4(T)$ of the steering torque signal T shown in FIG. 21B, for example. The steering angle sensitive gain section 66 sets the steering angle sensitive gain $G_5(\theta)$ based on a steering angular signal θ. A specific example of the steering angle sensitive gain $G_5(\theta)$ includes a primary delay function $G_5(\theta)$ of the steering angular signal $\theta$ shown in FIG. 21C, for example.

A primary function may be used instead of the primary delay functions $G_3(\omega)$, $G_4(T)$ and $G_5(\theta)$ used in the $\omega$-sensitive gain section 64, the steering torque sensitive gain section 65 and the steering angle sensitive gain section 66.

Figure 22:
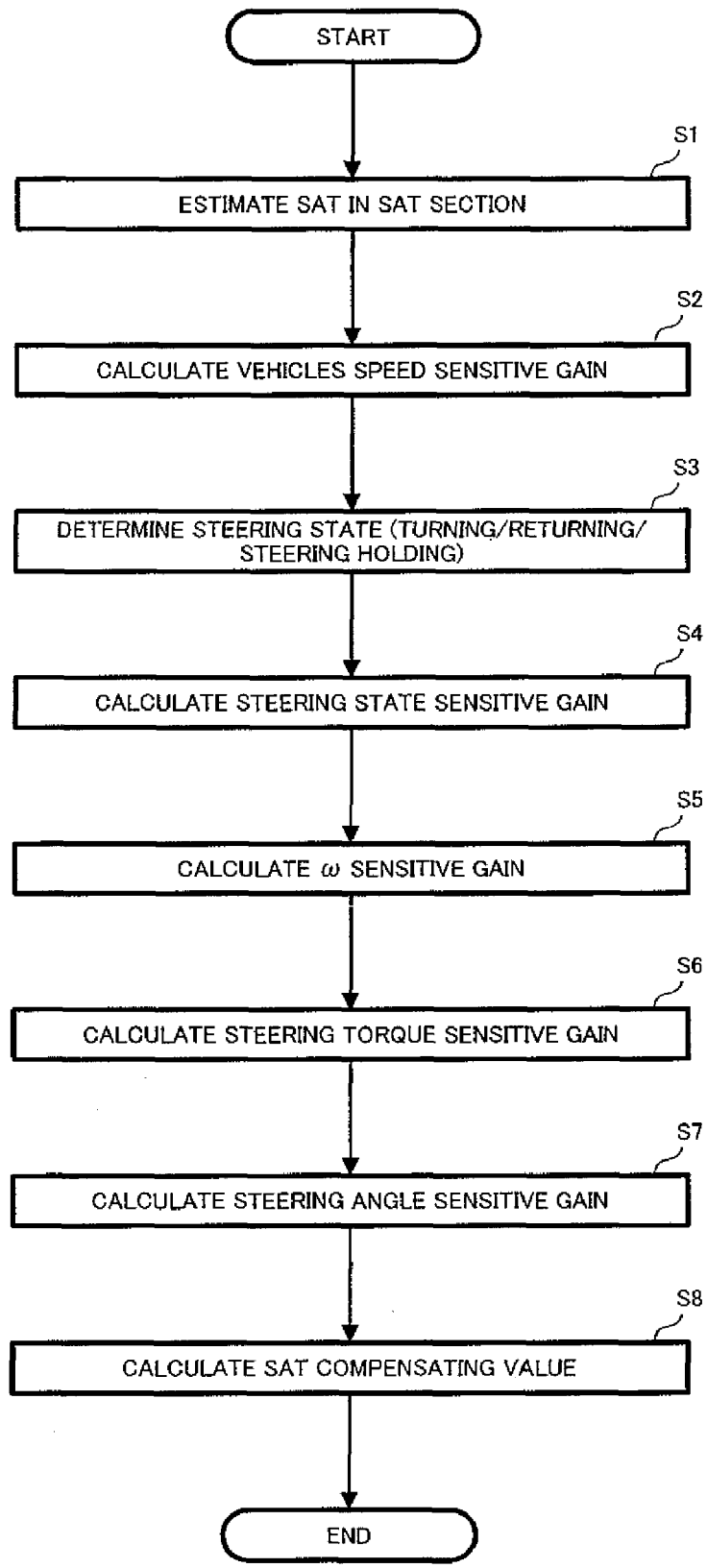
FIG. 22 is a flowchart for explaining an operation example of the control apparatus of the electric power steering apparatus according to the present invention.

An operation example of the control apparatus is shown in a flowchart of FIG. 22. Namely, in the present invention shown in FIG. 22, the self-aligning torque SAT is estimated by the SAT section 41 (Step S1). The vehicle speed sensitive gain section 60 calculates the vehicle speed sensitive gain G1 based on the vehicle speed V (Step S2). The steering state determining section 61 determines the steering state (turning steering, returning steering, steering holding), and outputs a determined signal (Step S3).

The steering state sensitive gain section 63 calculates the steering state sensitive gain G2 according to the determined signal (Step S4). The $\omega$-sensitive gain section 64 calculates the $\omega$-sensitive gain $G_3(\omega)$ based on the steering angular speed signal $\omega$ (Step S5). The steering torque sensitive gain section 65 calculates the steering torque sensitive gain $G_4(T)$ based on the steering torque signal T (Step S6). The steering angle sensitive gain section 66 calculates the steering angle sensitive gain $G_5(\theta)$ based on the steering angle signal $\theta$ (Step S7).

The self-aligning torque SAT, the vehicle speed sensitive gain $G_1$, the steering state sensitive gain $G_2$, the $\omega$-sensitive gain $G_3(\omega)$, the steering torque sensitive gain $G_4(T)$, and the steering angle sensitive gain $G_5(\theta)$ are calculated, so that the SAT compensating value can be calculated. That is to say, a relationship: SAT compensating value=SAT·$G_1$·$G_2$·$G_3(\omega)$)·$G_4(T)$·$G_5(\theta)$ is established (Step S8).

When the control apparatus of the electric power steering apparatus according to the present invention is used, the SAT compensating value is controlled in the on-center and off-center states. For this reason, the design of steering torque hysteresis widths (SAT compensating values), which are suitable at the time of on-center and off-center can be controlled, and the steering state (turning steering, returning steering, steering holding), is determined. As a result, the design of a steering torque hysteresis width (SAT compensating value) at the time of steering holding can be also controlled.

In the control apparatus of the electric power steering apparatus according to the present invention, for example in the case where the steering angular speed is low such as hands free after the steering angle is inputted at the time of running, the steering angular speed sensitive gain, the steering torque sensitive gain and the steering angle sensitive gain are simultaneously used, so that the SAT compensating value is adjusted. For this reason, only convergency can be improved without deteriorating the return of a steering wheel.

When a tuning is carried out so that the self-aligning torque (steering torque) increases at the time of on-center (namely, the steering torque is small or the steering angle is small), a driver feels loss of resistance at the time of operating the steering wheel right and left at small steering angles little by little. In the present invention, when the steering angular speed is high, the steering angular speed sensitive gain is used, and thus the self-aligning torque compensating value is set so that the steering torque (the feel of resistance) increases, namely, feeling of stickiness increases. For this reason, the loss of resistance can be prevented.

That is to say, in the control apparatus of the electric power steering apparatus according to the present invention, the steering angular speed sensitive gain, the steering torque sensitive gain and the steering angle sensitive gain are used, so that the loss of steering resistance can be prevented at the time of operating the steering wheel right and left at small steering angles little by little during a traveling. The present invention has the effect equivalent to that of a hydraulic power steering (non-return valve).

In the present invention, the self-aligning torque is compensated based on the steering state (turning steering, returning steering or steering holding), the steering angular speed (motor speed), the steering angle and the steering torque. For this reason, the satisfactory steering feeling can be realized at the time of on-center, off-center and steering holding not only in small-sized vehicles but also in large-sized vehicles.

What is claimed is:

1. A control unit for an electric power steering apparatus, the control unit comprising
    a steering assist command value calculating section that calculates a steering assist command value based on a steering torque signal from a torque sensor;
    a current control section that calculates a voltage command value based on the steering assist command value;
    a motor driving section that drives a motor based on the voltage command value, wherein an assist power from the motor is applied to a steering system;
    a self-aligning torque (SAT) estimating section that estimates or measures an SAT based on an angular speed and an angular acceleration of the motor, the steering assist command value and the steering torque signal; and
    an SAT feedback section that feeds back an SAT signal obtained by the SAT estimating section to the steering assist command value;
    wherein the SAT feedback section comprises:
        a steering state determining section to determine a steering state based on the steering torque signal and the angular speed; and
        a gain section to adjust a gain in response to the steering state, and the gain from the gain section is multiplied with the SAT signal.

2. The control unit for an electric power steering apparatus according to claim 1, wherein a compensation value of a function according to the angular speed outputted from a function converting section is multiplied with the SAT signal.

3. The control unit for an electric power steering apparatus according to claim 1, wherein a characteristic of the steering state determining section changes according to a vehicle speed signal.

4. The control unit for an electric power steering apparatus according to claim 1, wherein a signal obtained by multiplying a gain of the gain section with the SAT signal is further multiplied with a gain of a steering angle sensitive gain section which changes according to a steering angle signal.

5. The control unit for an electric power steering apparatus according to claim 1, wherein a signal obtained by multiplying a gain of the gain section with the SAT signal is further multiplied with a gain of a steering torque sensitive gain section which changes according to the steering torque signal.

6. The control unit for an electric power steering apparatus according to claim 1, wherein a signal obtained by multiplying a gain of the gain section with the SAT signal is further multiplied with a gain of a steering angular speed sensitive gain section which changes according to a steering angular speed signal.

* * * * *